United States Patent
Yonezawa et al.

(10) Patent No.: US 6,812,707 B2
(45) Date of Patent: Nov. 2, 2004

(54) DETECTION ELEMENT FOR OBJECTS AND DETECTION DEVICE USING THE SAME

(75) Inventors: Tadashi Yonezawa, Saitama (JP); Takanori Endo, Saitama (JP); Seiro Yahata, Tokyo (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 10/440,138

(22) Filed: May 19, 2003

(65) Prior Publication Data

US 2003/0231020 A1 Dec. 18, 2003

Related U.S. Application Data

(63) Continuation of application No. 09/868,337, filed as application No. PCT/JP99/05732 on Oct. 18, 1999, now abandoned.

(51) Int. Cl.$^7$ .................................................. G01V 3/11
(52) U.S. Cl. ........................................... 324/326; 324/67
(58) Field of Search ........................... 405/157; 324/326, 324/329, 633, 635; 340/572.5, 572.6, 572.8, 859.1, 539.23, 547; 343/841, 719; 89/1, 13

(56) References Cited

U.S. PATENT DOCUMENTS

| | | | |
|---|---|---|---|
| 3,163,703 A | 12/1964 | McLoad ................... | 174/11 R |
| 3,721,989 A | 3/1973 | Christensen ................ | 343/701 |
| 3,836,842 A | 9/1974 | Zimmermann et al. ..... | 324/239 |

(List continued on next page.)

FOREIGN PATENT DOCUMENTS

| | | |
|---|---|---|
| JP | 63-72579 | 5/1988 |
| JP | 04002022 A | 1/1992 |
| JP | 7-43459 | 2/1995 |
| JP | 8-166446 | 6/1996 |
| JP | 10-285089 | 10/1998 |
| JP | 63243897 A | 10/1998 |

*Primary Examiner*—N. Le
*Assistant Examiner*—Darrell Kinder
(74) *Attorney, Agent, or Firm*—Oblon, Spivak, McClelland, Maier & Neustadt, P.C.

(57) ABSTRACT

A body detecting element is buried in the ground together with a body such as a metal body and includes a magnetic member acting as a magnetic core, an antenna coil wound around the magnetic member and a capacitor connected to both the ends of the antenna coil for forming a resonance circuit together with the antenna coil. The antenna coil is mounted on the body integrally therewith through an electromagnetic shield member with the outer peripheral surface thereof confronting the outer surface of the body. A body detecting element includes an RFID circuit connected to the antenna coil and mounted on a body integrally therewith such that the outer peripheral surface of the antenna coil confronts the outer surface of the body through an electromagnetic shield member. Even if the body detecting element is mounted on the body such as the metal pipe integrally therewith, it can accurately detect the body because a resonant frequency and the Q value of the coil are not changed. There is almost no possibility that detecting element is broken or moved even if a body other than the above body is dug.

32 Claims, 11 Drawing Sheets

U.S. PATENT DOCUMENTS

| | | | |
|---|---|---|---|
| 4,323,848 A | 4/1982 | Kuckes | 324/338 |
| 4,558,297 A | 12/1985 | Shigeta et al. | 336/213 |
| 4,706,031 A * | 11/1987 | Michiguchi et al. | 324/337 |
| 4,811,030 A | 3/1989 | Pedersen | 343/788 |
| 4,862,088 A | 8/1989 | Etienne et al. | 324/326 |
| 4,873,533 A | 10/1989 | Oike | 343/744 |
| 4,947,012 A | 8/1990 | Minarovic | 219/535 |
| 5,463,320 A | 10/1995 | Bonner et al. | 326/366 |
| 5,506,505 A * | 4/1996 | Worthen et al. | 324/326 |
| 5,640,092 A * | 6/1997 | Motazed et al. | 324/326 |
| 5,748,013 A | 5/1998 | Beauclair et al. | 336/233 |
| 5,773,984 A * | 6/1998 | Suyama et al. | 324/635 |
| 5,825,298 A | 10/1998 | Walter | 340/825.49 |
| 5,864,323 A | 1/1999 | Berthon | 343/788 |
| 5,920,194 A | 7/1999 | Lewis et al. | 324/326 |
| 6,031,458 A | 2/2000 | Jacobsen et al. | 340/572.5 |
| 6,271,667 B1 | 8/2001 | Minarovic | 324/326 |
| 6,346,884 B1 * | 2/2002 | Uozumi et al. | 340/572.1 |
| 6,559,646 B2 * | 5/2003 | Mercer | 324/329 |
| 6,597,175 B1 * | 7/2003 | Brisco | 324/326 |

\* cited by examiner

DETECTION ELEMENT FOR OBJECTS AND DETECTION DEVICE USING THE SAME

This application is a continuation of and claims priority to parent application U.S. Ser. No. 09/868,337, filed on Nov. 27, 2001 now abandoned, which is the National Stage of International Application No. PCT/JP99/05732, filed Oct. 18, 1999, the entire contents of which are incorporated herein by reference.

BACKGROUND OF THE INVENTION

1. Field of the Invention

The present invention relates to a detecting element for detecting a metal pipe before or after it is installed in or on the ground or detecting a body such as a crushing powder, explosive and the like loaded at a predetermined place and to a detecting apparatus using the detecting element.

2. Description of the Related Art

Many kinds of metal pipes having almost the same outside diameter are installed in and on the ground in large Sophisticated plants such as petroleum refining plants, electric power plants, ship yards, chemical plants and the like. When many kinds of metal pipes must be installed at a time so that these large plants are newly constructed in a short period of time, identification codes and characters are conventionally applied to the metal pipes themselves with coloring materials such as paints and the like which are difficult to be decolorized before the metal pipes are connected in order to prevent different kinds of metal pipes from being connected to each other. Then, the installation dates of the metal pipes, the materials of the metal pipes, the sizes of them, the manufacture of them, the names of fluids flowing in the pipes, piping systems of them and other necessary data are written on different drawings and papers or recorded in a computer as electronic data using the identification codes and characters as reference data. When the metal pipes are connected, the identification codes and the like of the metal pipes themselves are visually checked against the drawings, the papers and a computer list for the discrimination thereof. Further, when the metal pipes are inspected, repaired or replaced after they are installed, the identification codes and the like of the metal pipes themselves are visually checked against the drawings and the like for the discrimination thereof so that the metal pipes are checked against their history information in the same manner as that they are installed. Furthermore, the information of the result of inspection and the like of the pipes are recorded on the papers and the like while checked with the identification codes and the like of the metal pipes themselves.

In contrast, these metal pipe identifying and checking jobs are also carried out to various kinds of pipes buried in the ground such as gas pipes, tap water pipes, sewerage pipes, cable pipes, optical fiber pipes, oil transportation pipes, chemicals transportation pipes and the like, similarly. That is, buried metal pipes may be repaired or replaced after they are used for a long period of time. In a construction work carried out at the time, the positions of the buried metal pipes must be accurately located from the ground and earth and sand must be dug. Conventionally, metal pipe detecting markers are known as a device for detecting buried metal pipes. The marker is composed of a columnar ferrite, an antenna coil wound around the ferrite and a capacitor connected to both the ends of the antenna coil. The antenna coil and the capacitor constitutes a resonance circuit. The ferrite, the antenna coil and the capacitor are accommodated in an insulating case. The metal pipe detecting marker is buried at the necessary position of the metal pipe together therewith. Thereafter, the position of the metal pipe is detected by detecting the marker by resonating the resonance circuit from the ground by transmitting a radio wave having a specific frequency using a dedicated detecting apparatus and receiving the resonated radio wave in a construction work.

When a pipe is made of metal, in particular, when the pipe is a magnetic body such as a cast iron pipe, a steel pipe and the like, if the metal pipe detecting marker is directly mounted on the outer surface of the metal body or disposed at a position very near thereto, the resonance frequency of the resonance circuit of the marker is varied by the change of the self-inductance of the resonance circuit as well as the Q value of the coil is greatly lowered. Thus, the marker cannot be accurately detected. To cope with this problem, when the marker is used to detect the metal pipe, it is buried at a position spaced apart from the pipe by a distance larger than the diameter of the pipe.

However, in the conventional method of applying the identification code and the characters to the metal pipe itself and visually discriminating and checking them, a problem arises in that a considerable time and labor are necessary to discriminate and check metal pipes when they are installed under the ground where illumination facilities are not sufficiently provided, when they are installed in the ground or when they are installed on the ground in a complicated fashion, they may be erroneously identified.

To improve the above point, it is tried to mount a non-contact type RFID (radio frequency identification device) on a metal pipe. However, when the metal pipe is the magnetic body such as the cast iron pipe, the steel pipe and the like, if the RFID is directly mounted on the outer surface of the pipe body or disposed at a position very near thereto, the resonance frequency of the radio wave transmitted from an external identification device is varied by the change of the self-inductance of the antenna coil of the RFID as well as the Q value of the antenna coil is greatly lowered. Thus, there arises a problem that the function of the RFID cannot be achieved.

Further, when the markers are buried at positions spaced apart from metal pipes, the positions where the markers are buried and the axial lines of the coils of the markers are varied depending upon workers and a detection error may be increased. Further, when another construction work is carried out after a metal pipe is buried, the marker may be broken or the marker itself may be moved. Accordingly, there is also a disadvantage that the above conventional metal pipe detecting marker cannot detect a metal pipe in such a case.

Further, when a body to be detected is a crushing powder or explosive loaded in a hole drilled in a rock, rock bed, concrete and the like for crushing the rock and the like, it is necessary to accurately detect or search a crushing powder or explosive which remains without being exploded to secure the safety of a job for removing muck such as earth, sands and rocks after the crushing powder or explosive is exploded.

A first object of the present invention is to provide a body detecting element capable of accurately identifying a body without changing the resonance frequency of the radio wave transmitted from an identification device for activating a RFID circuit and without changing the Q value of an antenna coil even if the body detecting element is mounted on a body such as a metal pipe and the like installed in or on the ground integrally therewith and to provide a detecting apparatus using the detecting element.

A second object is to provide a body detecting element which is not almost broken and moved even if a body other than a body to be detected is dug up and to provide a detecting apparatus using the detecting element.

A third object of the present invention is to provide a body detecting element capable of accurately detecting a body such as a crushing powder or explosive which is loaded at a predetermined position and is not yet exploded and to provide a detecting apparatus using the detecting element.

SUMMARY OF THE INVENTION

A first aspect of the invention discloses a body detecting element which is buried in the ground together with a body and includes a magnetic member acting as a magnetic core, an antenna coil wound around the magnetic member and a capacitor or a piezo-resonator connected to both the ends of the antenna coil for forming a resonance circuit together with the antenna coil. In the detecting element, the body is a metal body and the antenna coil is mounted on the body integrally therewith with the outer peripheral surface thereof confronting the outer surface of the body.

When the antenna coil is mounted on the body such that the outer peripheral surface thereof confronts the outer surface of the body, the resonance circuit composed of the coil and the capacitor or the piezo-resonator is resonated and the lines of magnetic forces emitted from the resonance circuit are directed in the axial direction of the magnetic member. This direction is substantially in parallel with the outer surface of the body and many of the lines of magnetic force do not pass through the body. Thus, even if the body is composed of a ferromagnetic body such as cast iron, steel and the like, it is difficult for the body to be affected by the lines of magnetic force. As a result, since the self-inductance of the coil is less changed, the resonance frequency of the resonance circuit is scarcely changed. Further, since the Q value of the coil is little dropped, the width of resonance of the resonance frequency is made acute, whereby the resonance characteristics of the detecting element can be enhanced. At the time, when the piezo-resonator is connected to both the ends of the antenna coil, the change of the resonance frequency is reduced even if the self-inductance of the coil is somewhat changed.

In particular, when an electromagnetic shield member composed of copper, copper alloy or aluminum is interposed between the outer peripheral surface of the coil and the outer surface of the body as shown in a modification of the first aspect of the invention, the lines of magnetic force emitted from the resonance circuit scarcely passes through the body, whereby the resonance characteristics of the marker is more enhanced.

According to a modification of the first aspect of the invention, the body is a metal pipe, the magnetic member, the antenna coil and the capacitor or the piezo-resonator are wrapped with an insulating member, and the portion of the insulating member, which is in contact with the metal pipe, is formed in a recessed surface.

The formation of the portion of the insulating member in contact with the metal pipe in the recessed surface permits the detecting element to be stably mounted.

According to a modification of the first aspect of the invention, the body is a metal pipe, the magnetic member, the antenna coil, the capacitor or the piezo-resonator and the electromagnetic shield member are wrapped with an insulating member, and the portion of the insulating member for covering the electromagnetic shield member is formed in a recessed surface.

When the electromagnetic shield member is used, the formation of the surface of the insulating member on which the electromagnetic shield member exists in the recessed surface prevents the detecting element from being erroneously mounted.

A second aspect of the invention discloses a body detecting element which is buried in the ground together with a body and includes a magnetic member acting as a magnetic core, an antenna coil wound around the magnetic member and a capacitor or a piezo-resonator connected to both the ends of the antenna coil for forming a resonance circuit together with the antenna coil. In the detecting element, the body is a metal pipe composed of a non-magnetic material, and the magnetic member is formed to cover the outer peripheral surface of the metal pipe and mounted on the metal pipe integrally therewith.

When the resonance circuit is arranged such that the outer surface of the metal pipe composed of the non-magnetic material is covered with the magnetic member and the antenna coil is wound around the magnetic member, the diameter of the coil can be increased, whereby the detecting element having a high resonance performance can be obtained. The lines of magnetic force emitted from the resonance circuit being resonated are not affected by the metal pipe because the surface of the metal pipe acts as an electromagnetic shield member.

When the body is a metal pipe composed of a magnetic material as shown in a third aspect of the invention, if the magnetic member is formed so as to cover the outer peripheral surface of the metal pipe as the body through the electromagnetic shield member composed of copper, copper alloy or aluminum, the lines of magnetic force emitted from the resonance circuit being resonated are directed in the axial direction of the magnetic member which is substantially in parallel with the outer peripheral surface of the body. As a result, even if the body is composed of a ferromagnetic body such as cast iron, steel and the like, the electromagnetic shield member makes it difficult for the lines of magnetic force to be affected by the body.

According to a fourth aspect of the invention, the body is a crushing powder or an explosive and the magnetic member acting as the magnetic core is formed of a composite material containing Fe or Fe—Co alloy powder or flake in an amount not less than 74 wt % to not more than 86 wt % and plastic in an amount not less than 14 wt % to not more than 26 wt %.

When Fe or Fe alloy is in an amount less than 74 wt %, it is difficult to obtain sufficient magnetic characteristics, whereas when it is in an amount exceeding 86 wt %, the magnetic member is made brittle. Further, to obtain a magnetic core composed of a columnar body from the magnetic member, it is preferable to make the cross-sectional shape of the columnar body to a rectangular shape or an elliptic shape to lower the resistance loss of the antenna coil, and it is further preferable that the ratio of the long side to the short side of the rectangular shape and the ratio of the major axis to the minor axis of the elliptic shape are not less than 1.2 to less than 16, respectively. When these ratios are less than 1.2 or not less than 16, the resistance loss of the antenna coil will be increased.

According to a fifth aspect of the invention, a detecting apparatus comprises a transmitting unit for transmitting a radio wave having a specific frequency from the ground to a body detecting element buried in the ground together with a body to resonate the resonance circuit of the body detecting element, a receiving unit for receiving a radio wave generated by the resonation of the resonance circuit of the detecting element, and a detection and display unit for detecting and displaying the received radio wave.

When a radio wave of specific frequency is transmitted from the transmitting unit of the detecting apparatus, the resonance circuit of the detecting element is resonated thereby and emits a second radio wave. The accurate position of the detecting element can be detected by the receiving unit which receives the secondary radio wave. As a result, the body can be reliably detected.

A sixth aspect of the invention discloses a body detecting element which is mounted on a body composed of a metal body and includes a magnetic member acting as a magnetic core, an antenna coil wound around the magnetic member and an RFID circuit connected to the antenna coil. The RFID circuit includes a memory for storing data characteristic to the metal body, is activated by a radio wave having a specific frequency and transmitted from a detecting apparatus, reads data from the memory in response to a read command issued by the data communication through the radio wave, writes data to the memory in response to a write command and issues a response command to the detecting apparatus. In the detecting element, the antenna coil is mounted on the body integrally therewith with the outer peripheral surface thereof confronting the outer surface of the body.

The external detecting apparatus transmits the identification code query signal of the detecting element thereto. When the antenna coil receives the radio wave of specific frequency of the query signal, the RFID circuit is activated by the power generated to the coil through the electromagnetic induction thereof. The detecting element having received the query signal transmits the identification code characteristic to the metal body to the detecting apparatus. The detecting apparatus having received the identification code specifies the body composed of the metal body. Since the detecting element is mounted on the body such that the outer peripheral surface of the antenna coil confronts the outer surface of the body, the lines of electromagnetic force generated to the coil and emitted therefrom are directed in the axial direction of the magnetic member. The direction is substantially in parallel with the outer surface of the body and many of the lines of magnetic force do not pass through the body. Thus, even if the body is composed of a ferromagnetic body such as cast iron, steel and the like, it is difficult for the lines of magnetic force to be affected by the body. As a result, since the self-inductance of the coil is less changed, the frequency of the query signal is scarcely changed. Further, since the Q value of the coil is little dropped, the detecting element is reliably activated as well as data communication can be carried out to the detecting apparatus.

In particular, when the electromagnetic shield member composed of copper, copper alloy or aluminum is interposed between the outer peripheral surface of the coil and the outer surface of the body, the lines of magnetic force emitted from the coil are scarcely pass through the body, whereby the identification performance of the detecting element can be more enhanced.

According to a modification of the sixth aspect of the invention, the body is a metal pipe, the magnetic member, the antenna coil and the RFID circuit are wrapped with an insulating member, and the portion of the insulating member, which is in contact with the body, is formed in a recessed surface.

The formation of the insulating member in contact with the metal pipe in the recessed surface permits the detecting element to be stably mounted.

According to a modification of the sixth aspect of the invention, the body is a metal pipe, the magnetic member, the antenna coil, the RFID circuit and the electromagnetic shield member are wrapped with an insulating member, and the portion of the insulating member for covering the electromagnetic shield member is formed in a recessed surface.

When the electromagnetic shield member is used, the formation of the surface of the insulating member on which the electromagnetic shield member exists in the recessed surface prevents the detecting element from being erroneously mounted.

According to a seventh aspect of the invention, a body detecting element is mounted on a body and includes a magnetic member acting as a magnetic core, an antenna coil wound around the magnetic member and an RFID circuit connected to the antenna coil. The RFID circuit includes a memory for storing data characteristic to the body, is activated by a radio wave having a specific frequency and transmitted from a detecting apparatus, reads data from the memory in response to a read command issued by the data communication of the radio wave, writes data to the memory in response to a write command and issues a response command to the detecting apparatus. The arrangement of the detecting element is characterized in that the body is a metal pipe composed of a non-magnetic material and the magnetic member is formed to cover the outer peripheral surface of the body and mounted on the body integrally therewith.

When the outer surface of the body composed of the non-magnetic material is covered with the magnetic member and the antenna coil is wound around the magnetic member, the diameter of the coil can be increased, whereby a detecting element of high performance can be obtained. The lines of electromagnetic force emitted from the antenna coil in response to the radio wave transmitted from the detecting apparatus are not affected by the metal pipe as the body because the surface of the metal pipe acts as the electromagnetic shield member.

When the body is a metal pipe composed of a magnetic material as shown in an eighth aspect of the invention, if the magnetic member is formed to cover the outer peripheral surface of the body through an electromagnetic shield member composed of copper, copper alloy or aluminum, the lines of magnetic force emitted from the antenna coil in response to the radio wave transmitted from the detecting apparatus is directed in the axial direction of the magnetic member which is substantially in parallel with the outer peripheral surface of the body. As a result, even if the body is composed of a ferromagnetic body such as cast iron, steel and the like, the electromagnetic shield member makes it difficult for the lines of magnetic force to be affected by the body.

According to a ninth aspect of the invention, a body detecting apparatus comprises a means for transmitting a radio wave having a specific frequency to a body detecting element mounted on a body integrally therewith, a means for activating the RFID circuit of the body detecting element in response to the radio wave, a means for reading and writing data from and in the memory of the RFID circuit, and a means for receiving a response signal from the detecting element, thereby identifying the body.

When the external detecting apparatus transmits a radio wave of specific frequency, the RFID circuit of the detecting element is activated by the radio wave and at the same time data is read and written from and in the memory of the RFID circuit. The body can be identified by the detecting apparatus having received a response signal from the detecting element.

DESCRIPTION OF THE PREFERRED EMBODIMENTS

Figure 1:
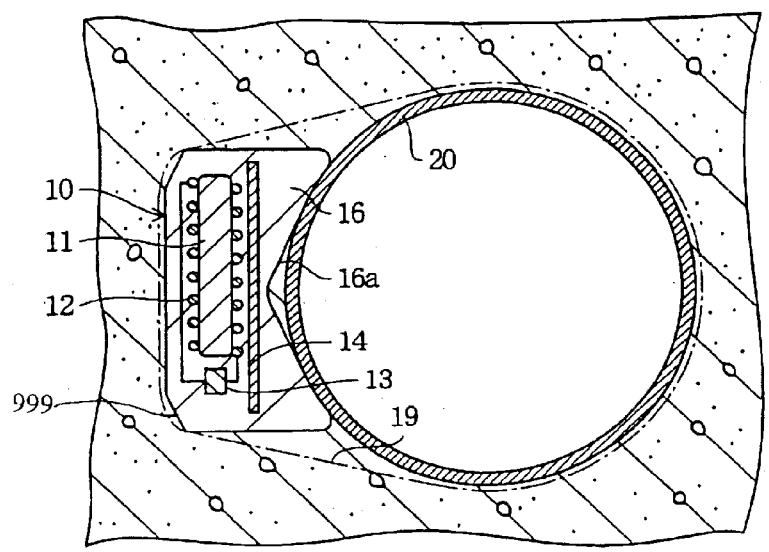
FIG. 1 is a sectional view showing how a detecting element using an electromagnetic shield member is mounted on a body.

[1] First, embodiments of a body detecting element composed of an antenna coil and a capacitor and a detecting apparatus using the body detecting element of the present invention will be described.

(a) Use of Body Detecting Element

Exemplified as a body to be detected by the detecting element of the present invention is a crushing powder or an explosive loaded at a predetermined place to crush or explode a metal body, rock, rock bed, concrete and the like. Mainly exemplified as the metal body are various kinds of metal pipes buried in the ground such as a gas pipe, tap water pipe, sewerage pipe, cable pipe, optical fiber pipe, and the like. The detecting element is also applied to detect metal products which are buried in the ground or to the bottom of water for a special object and must be collected later, in addition to the above metal pipes. Exemplified as the material of the metal pipe is a ferromagnetic or conductive material as used in an ion pipe, cast iron pipe, copper or copper alloy pipe corrosion- or heat-resistant alloy pipe and the like.

(b) Arrangement of Body Detecting Element

As the shapes of a magnetic member acting as the magnetic core of the antenna coil of the present invention, a solid sheet shape, solid columnar shape and solid square pillar shape are employed in a first aspect of the invention, the modifications of the first aspect of the invention, a fourth aspect of the invention and the modifications of the fourth aspect of the invention; and a hollow cylindrical shape is employed in a second aspect of the invention, a third aspect of the invention and the modification of the third aspect of the invention. The cylindrical shape may be formed by assembling a plurality of arc-shaped sheet pieces or formed of a thin film or foil.

Exemplified as the magnetic member are (1) a laminated body made by alternately laminating a plurality of soft magnetic metal thin films or thin sheets and a plurality of insulating thin films or a laminated body made by laminating a plurality of surface-insulated soft magnetic material thin films or thin sheets, (2) a composite material of soft magnetic metal powder or flake and plastic, (3) a composite material of soft magnetic metal powder or flake, ferrite powder and plastic, (4) a composite material of ferrite powder and plastic, (5) sintered ferrite, and the like. In the above items 1–5, it is preferable to use soft magnetic metal, whose permeability is not changed by an environmental temperature and whose resonance frequency is not changed when it is used as a resonance circuit, as the magnetic member. It is preferable that the shape of the magnetic member is a thin film, powder or flake to prevent the deterioration of the resonance characteristics thereof which is caused by an eddy current made when a resonance frequency is high.

The soft magnetic metal thin film or thin sheet of the item (1) is formed of iron amorphous, cobalt amorphous, Permalloy, or silicon steel and has a thickness of 5–250 $\mu$M.

The insulating thin film is an insulating resin film composed of a polyester film, polyvinylidene chloride film, polyvinyl chloride film, polyethylene terephthalate (PET) film or the like having a thickness of 5–50 $\mu$m. Further, the insulating thin film may be an insulating paper.

Carbonyl iron powder or reduced iron powder is used as the soft magnetic metal powder of the above item (2) or (3). The soft magnetic metal flake is obtained in such a manner that after soft magnetic metal powder is formed by micro-graining iron, Permalloy, amorphous alloy or the like by atomizing, the soft magnetic metal powder is mechanically made flat. Further, flat flake, which is obtained by colliding soft magnetic metal molten particles against water-cooled copper and solidifying them, may be used.

A suitable method of making the composite material of the soft magnetic metal and the plastic is such that a mixture of soft magnetic metal powder or flake and powder of plastic such as nylon resin, polyethylene resin, acrylic resin, vinyl chloride resin or the like is kneaded and the kneaded material is made to pellets and then injection molded to a predetermined shape. At the time, when a magnetic field is applied in a magnetic direction and the soft magnetic metal is aligned in the injection of the mixture, the characteristics of the composite material as the detecting element can be further improved. In addition, the mixture of the soft magnetic metal powder or flake and the plastic powder may be molded to a sheet shape using rolls and then cut to strips, may molded by compression or may be molded by being cast into a mold. The characteristics of the composite material can be improved by aligning the soft magnetic metal by applying the magnetic field thereto in any of the above methods.

When the soft magnetic metal is powder, the diameter thereof is preferably within the range of 0.1–30 $\mu$m and more preferably within the range of 0.3–5 $\mu$m. When the soft magnetic metal is flake, the thickness thereof is preferably within the range of 0.1–10 $\mu$m and more preferably within the range of 0.3–5 $\mu$m. There is a problem that when the diameter of the soft magnetic metal is smaller than the above range, the powder is liable to be oxidized and when the diameter is larger than the above range, a loss due to an eddy current will be increased. In the mixing ratio of the plastic and the soft magnetic metal, the soft magnetic metal is preferably 10–95 wt % and more preferably 40–90 wt %. The balance is the plastic. When the percentage of the soft magnetic metal content is less than the above range, a disadvantage arises in that the permeability is too low, whereas when the percentage of the content thereof exceeds the above range, there is a disadvantage that a loss is increased because soft magnetic metal is in direct contact with each other and the magnetic member 11 is made conductive.

When the soft magnetic metal is Fe or Fe—Co alloy powder or flake, it is preferable to form the magnetic member from a composite material containing the powder or flake in an amount not less than 74 wt % to not more than 86 wt % and the plastic in an amount not less than 14 wt % to not more than 26 wt %. When the content of Fe or Fe—Co alloy is less than 74 wt %, it is difficult to obtain sufficient magnetic characteristics, whereas when the content exceeds 86 wt %, the magnetic material is made brittle. Further, to obtain a magnetic core composed of a columnar body from the magnetic material, it is preferable to make the cross-sectional shape of the columnar body to a rectangular shape or an elliptic shape to lower the resistance loss of the antenna coil, and it is further preferable that the ratio of the long side to the short side of the rectangular shape and the ratio of the major axis to the minor axis of the elliptic shape are not less than 1.2 to less than 16, respectively. When these ratios are less than 1.2 or not less than 16, the resistance loss of the antenna coil will be increased.

The antenna coil wound around the magnetic member of the present invention is a conductive wire composed of copper, copper alloy (Cu—Cr, Cu—Be, Cu—Zn), aluminum and the like which are excellent in conductivity. It is preferable that the conducive wire is coated with an insulating film. When the copper wire is wound around the magnetic core composed of the columnar body, it is preferable to wind it substantially uniformly over the entire length of the columnar body as the magnetic core. Although described later, a distance when the detecting apparatus detects the detecting element is increased by substantially uniformly winding the copper wire over the entire length of the magnetic core. The capacitor or a piezo-resonator is connected to both the ends of the antenna coil, thereby constituting the resonance circuit together with the antenna coil. A chip capacitor, ceramic capacitor, paper capacitor, electrolytic capacitor and the like are used as the capacitor, and a piezo-ceramic or quartz is used as the piezo-resonator.

The electromagnetic shield member of the present invention is used to avoid an electromagnetic effect from a body and to more improve the resonant characteristics of the resonance circuit of the detecting element when the body is composed of the ferromagnetic material such as iron and cast iron. For this purpose, the electromagnetic shield member must have an area larger than that of the magnetic member. Further, it is preferable to dispose the electromagnetic shield member with slight intervals defined between it and the surface of the body, the outer peripheral surface of the antenna coil and the surface of the magnetic member so that the electromagnetic shield member is not in direct contact therewith. Further, the electromagnetic shield member is composed of a non-magnetic and conductive sheet member or thin film composed of aluminum of high purity, copper or copper alloy of high purity and the like.

When the electromagnetic shield member is used, the sizes of the magnetic member and antenna coil, the number of windings of the coil and the capacitance of the capacitor are selected such that a predetermined resonance frequency can be obtained in the presence of the electromagnetic shield member. When the electromagnetic shield member is interposed between the outer peripheral surface of the coil and the body, the lines of magnetic force, which intend to pass through the body, of the lines of magnetic force which are output from the magnetic member in resonance pass on the electromagnetic shield member having high conductivity. Since the electromagnetic shield member does not have magnetism and has conductivity, there is no hysteresis loss and an eddy current loss is not almost caused. As a result, even if the body is a ferromagnetic body, since it does not affect the resonance circuit and the antenna coil is electromagnetically shielded from the body, the change of the self-inductance of the coil and the drop of a Q value can be perfectly prevented.

Since the magnetic member, antenna coil, capacitor and the like of the present invention are buried in the ground, it is preferable that they are wrapped with an insulating member excellent in air tightness and water tightness. It is preferable that the insulating member is composed of plastic such as polypropylene, nylon, polyester, vinyl chloride, vinyl acetate, ABS, polyethylene, epoxy resin and the like which can be easily processed and mass-produced. The magnetic member, the antenna coil, the capacitor and the like may be hermetically sealed in a plastic case. However, a plastic body, which is injection molded so as to cast them therein, is preferable because the durability thereof is more improved and the electric characteristics thereof is not changed when it is buried for a long period of time. When the body is composed of the magnetic material and the electromagnetic shield member is not provided, it is preferable to injection mold the plastic body so that the intervals between the outer peripheral surface of the antenna coil and the outer surface of the body is at least 60 mm. This is because that an electromagnet shielding effect is produced depending upon the intervals between the magnetic member and the body. When the body is the metal pipe, it is preferable to form the portion of the plastic case or the plastic body, which is in contact with the metal pipe, in a recessed surface because it can be stably mounted on the detecting element thereby. When the detecting element is mounted on metal pipes having the same diameter, it is preferable that the recessed surface is formed in a curved surface whose radius of curvature is the same as that of the outer peripheral surface of the metal pipes because the detecting element can be most stably mounted thereby. When the detecting element is mounted on a plurality of metal pipes having a different diameter, it is preferable to form the recessed surface in a versatile shape having a V-shaped cross-section which can be commonly used without changing the shape.

(c) Method of Mounting Body Detecting Element on a Body

Figure 2:
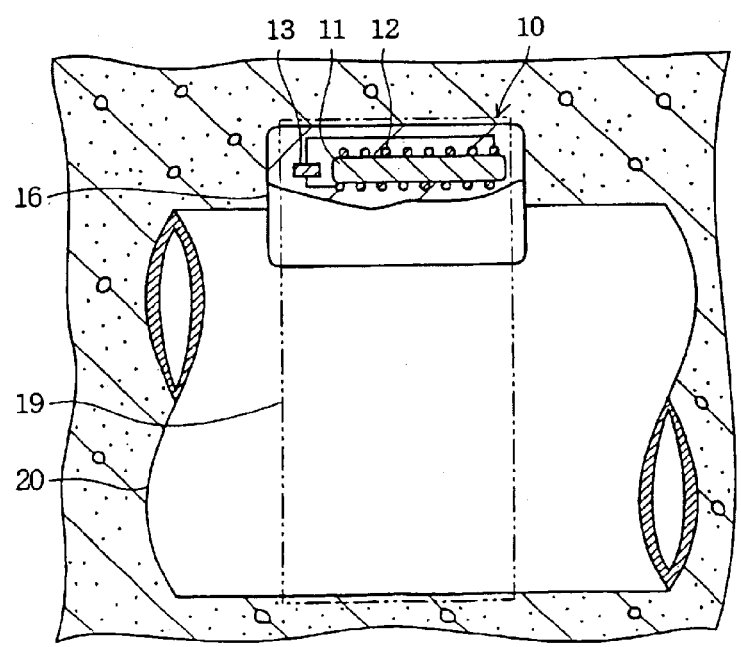
FIG. 2 is a sectional view showing how a detecting element using no electromagnetic shield member is mounted on the body by another method.

In the first aspect of the invention, a detecting element 10 is mounted on a body 20 integrally therewith such that the outer peripheral surface of an antenna coil 12 confronts the outer surface of a body 20 as shown in FIG. 1 or FIG. 2. The detecting element 10 may be directly bonded to the outer surface of the body 20 by an adhesive or mounted thereon through a screw means such as screws or the like. When the body 20 is a metal pipe, after the detecting element 10 is caused to come into contact with the outer peripheral surface of the metal pipe, it may be integrated with the metal pipe by an adhesive tape 19 wound therearound from above the detecting element 10 as shown in FIG. 1 and FIG. 2 or they may be integrated with each other by being tightened and fixed with a belt (not shown) provided with the detecting element 10. Otherwise, although not shown, the detecting element 10 may be fixed to the body 20 by the magnetic force of a strong permanent magnet secured to the portion of an insulating member in contact with the body 20.

Figure 3:
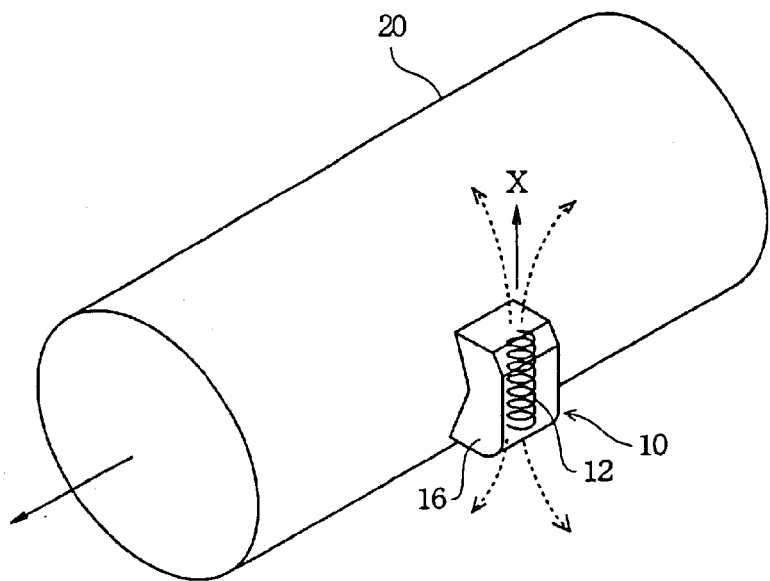
FIG. 3 is a perspective view showing how the detecting element is mounted on the body in correspondence to FIG. 1.
Figure 4:
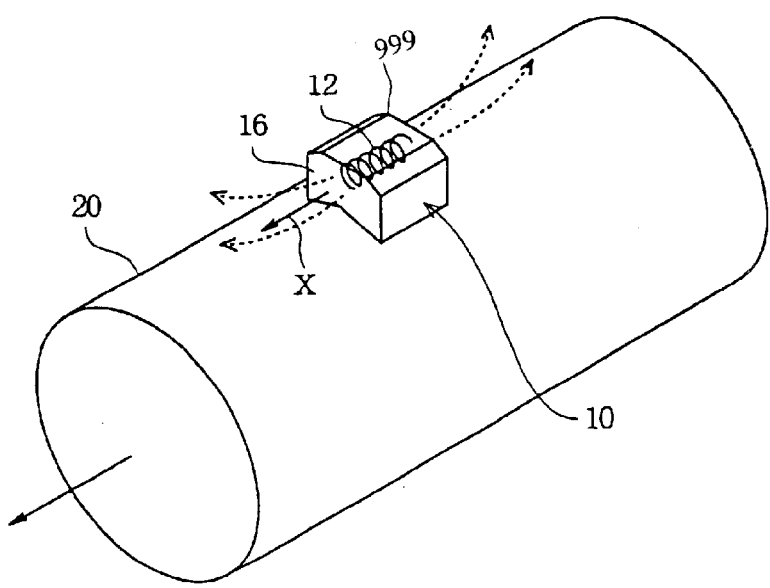
FIG. 4 is a perspective view showing how the detecting element is mounted on the body in correspondence to FIG. 2.

When the axial center direction X of the antenna coil 12 is directed toward the ground as shown in FIG. 3, the detecting element 10 is mounted on a side of the body 20 in parallel with the tangential line of the outer peripheral surface of the body 20. That is, the detecting element 10 is disposed with the axial center direction of the antenna coil 12 vertical to the axial center direction of the body 20. An equivalent circuit A at the time is shown in the lower portion of FIG. 7. Further, when the detecting element 10 is disposed such that the axial center direction X of the antenna coil 12 is directed horizontally in parallel with the axial center direction of the body 20 as shown in FIG. 4, the detecting element 10 is mounted on the upper surface of the body 20. Since more concentrated lines of magnetic force (magnetic flux) reach a detecting apparatus on the ground in the arrangement shown in FIG. 3, the detecting element 10 can be more accurately detected. In FIG. 3 and FIG. 4, the arrows of broken lines show the lines of magnetic force emitted in resonance.

When the electromagnetic shield member is used in a modification of the first aspect of the invention, the detecting element must be mounted such that the electromagnetic shield member directly confronts the body. In contrast, when the electromagnetic shield member is mounted oppositely, the resonance circuit is sandwiched between the electromagnetic shield member and the body and does not receive a radio wave at all so that the detecting element is not activated. When the outer surface of the body is flat, an identifying color material is coated or an identifying display such as a carved stamp is put on the surface of the insulating member where the electromagnetic shield member exists. When the body is the metal pipe, the formation of the portion 16 of the above insulating member, with which the electromagnetic shield member is covered in a recessed surface 16*a* can prevent the detecting element from being erroneously mounted. To perfectly prevent the mounting error of the detecting element, it is preferable to provide a projection or a convex portion (not shown) on the opposite surface of the detecting element or to form the opposite surface in a curved convex surface (999) so that the detecting element cannot be stably mounted on the opposite surface.

Figure 5:
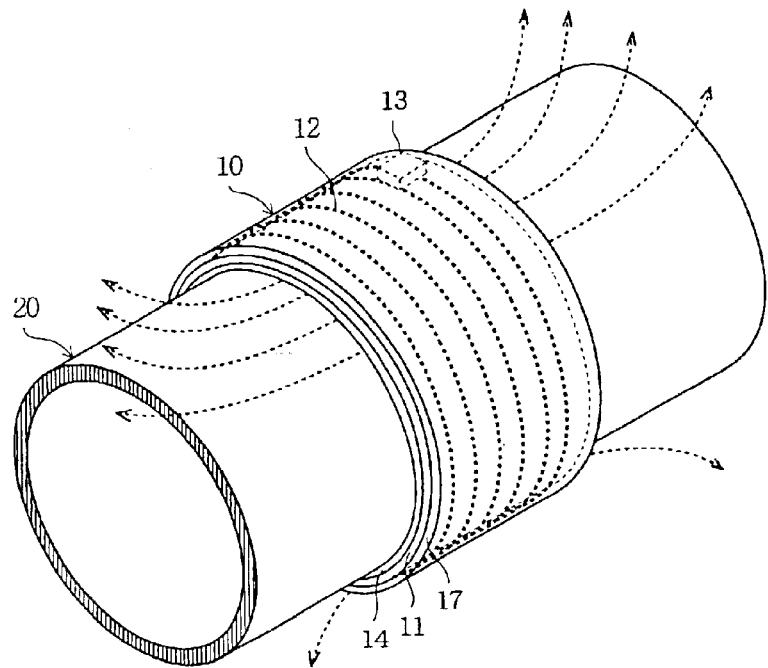
FIG. 5 is a perspective view showing how a detecting element using an electromagnetic shield member is mounted on a body.
Figure 6:
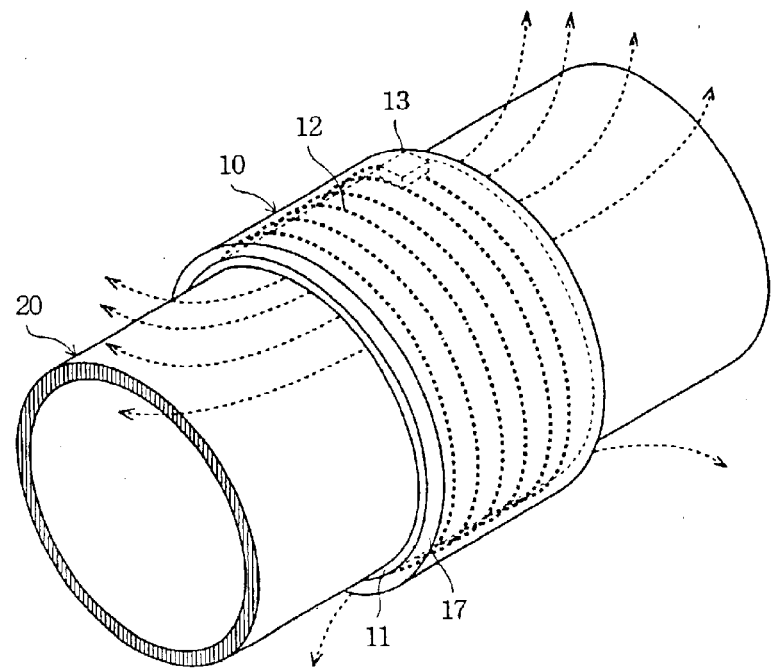
FIG. 6 is a perspective view showing how a detecting element using no electromagnetic shield member is mounted on a body.

In a third aspect of the invention, after the outer peripheral surface of the body 20 composed of the magnetic material is covered with an electromagnetic shield member 14 as shown in FIG. 5, the body 20 is covered with a magnetic member 11 through the electromagnetic shield member 14. As shown in FIG. 6, when the outer peripheral surface of the body 20 is composed of a non-magnetic material such as copper or copper alloy, the outer peripheral surface is directly covered with the magnetic member 11. Next, the antenna coil 12 is formed by winding a conductive wire around the magnetic member 11 and a capacitor 13 or a piezo-resonator is connected to both the ends of the coil. An equivalent circuit B thereof is shown in the lower portion of FIG. 7.

It is preferable to mount the detecting element on a body in a place where the body is manufactured or processed rather than to mount it in a field where it is buried. The detecting element 10 is made as described below. For example, when the body is the metal pipe, an electromagnetic shield member, which is composed of a conductive and non-magnetic thin film or a metal foil, is wound around the outer peripheral surface of a first plastic pipe (not shown) which has an inside diameter corresponding to the outside diameter of the metal pipe. Otherwise, the cylindrical electromagnetic shield member 14 is fitted on the metal pipe. Then, a plurality of arc-shaped magnetic members 11, which are formed by dividing a cylindrical body, are disposed on the outer peripheral surface of the electromagnetic shield member 14 through an insulating film (not shown) and further covered with an insulating film. Thereafter, a conductive wire is wound around the insulating film, thereby forming the antenna coil 12 and the capacitor 13 is connected to both the ends of the coil. The electromagnetic shield member 14, the magnetic member 11, the antenna coil 12 and the capacitor 13 are covered with a second different plastic pipe 17 and arranged integrally with the above first plastic pipe, whereby the detecting element 10 is made. When the detecting element is mounted on the metal pipe, it is fitted on a predetermined portion of the metal pipe as the body and fixed to the metal pipe through an adhesive, adhesive tape (both of them not shown) or the like. In FIG. 5 and FIG. 6, the arrows of dotted lines show lines of magnetic force in resonance.

Figure 8:
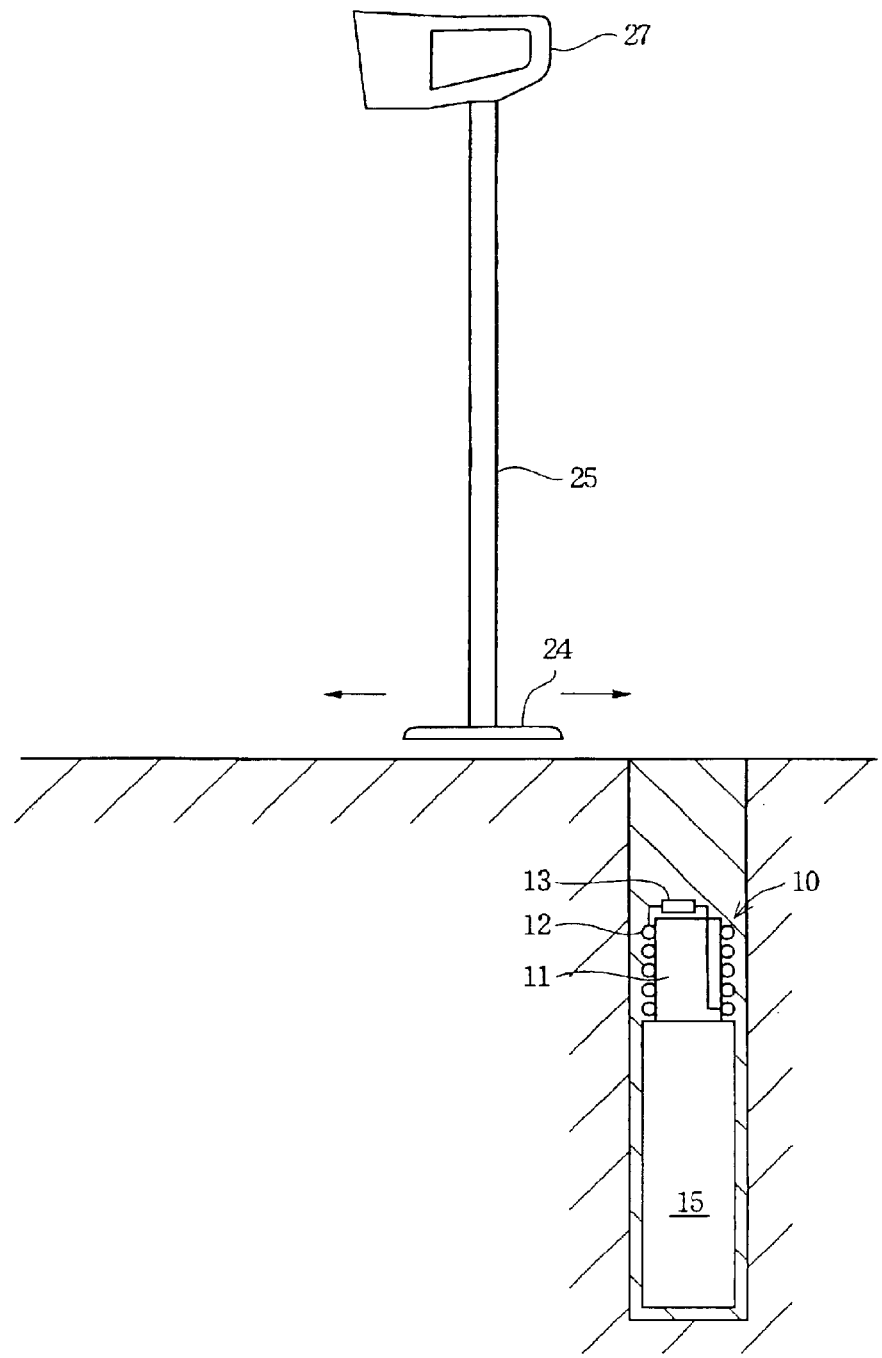
FIG. 8 is a view showing how the detecting element is loaded in a hole together with a crushing powder or explosive as a body.

In the fourth aspect of the invention in which the body is a crushing powder or explosive, when the crushing powder or explosive has an outer casing, the detecting element is mounted on the outer casing by the above method so as to be arranged integrally therewith. When the integral arrangement of the detecting element is difficult, it may be buried together with the crushing powder or explosive without being arranged integrally therewith. FIG. 8 shows a method of not arranging the detecting element integrally with the crushing powder or explosive. In the method, the detecting element 10, which includes the antenna coil 12 and the capacitor 13 or the piezo-resonator connected to both the ends of the antenna coil 12, is disposed to an end of a crushing powder or explosive 15 such that the axial center of the crushing powder or explosive 15 is in agreement with the axial center of the antenna coil 12. At the time, it is preferable to set the diameter of the antenna coil 12 to the same as or smaller than that of the crushing powder or explosive 15 because it is made unnecessary to specially increase the diameter of a hole for the detecting element 10.

(d) Arrangement of Detecting Apparatus for Detecting Element

Figure 7:
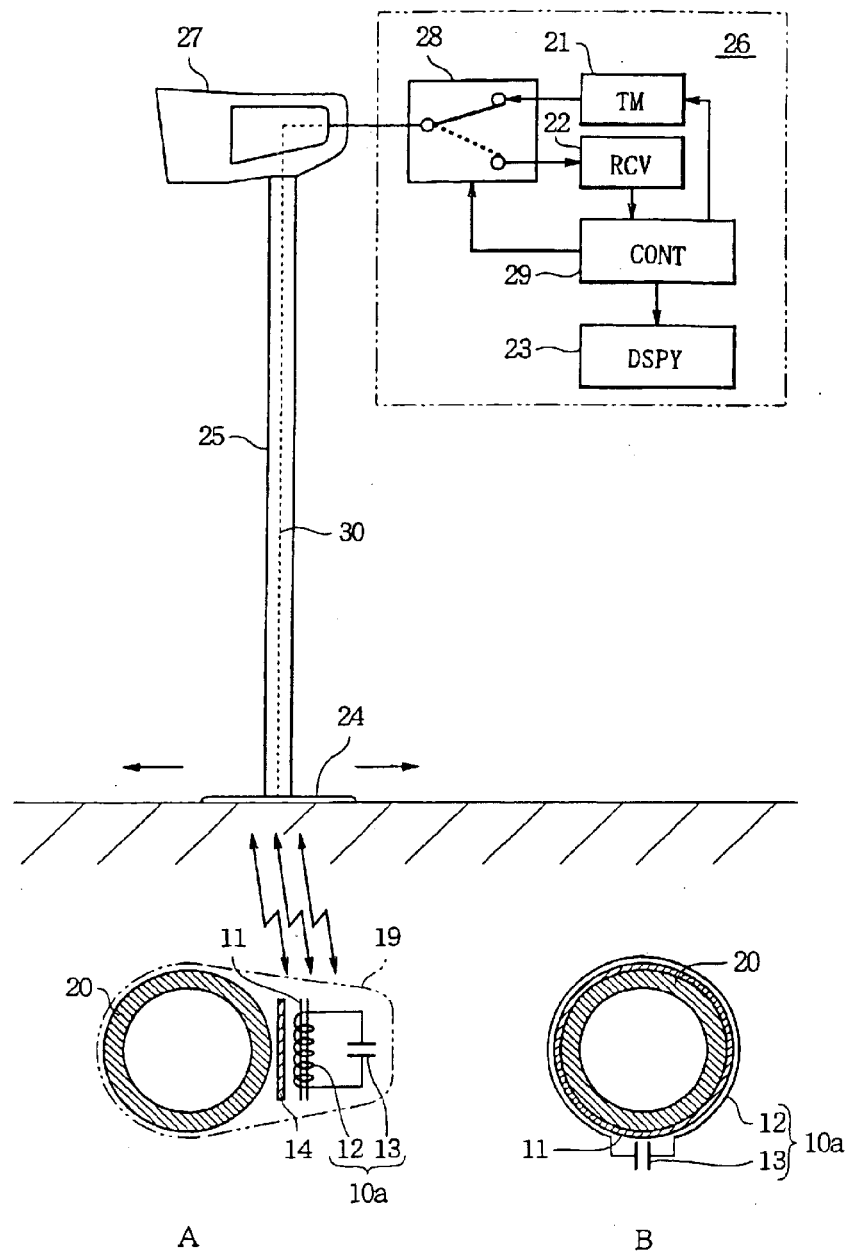
FIG. 7 is a view showing the arrangement of a detecting apparatus of the present invention and an equivalent circuit of the detecting element.

As shown in FIG. 7, the detecting apparatus is arranged as a stand type and includes a hollow core loop antenna 24 facing the ground, a pole 25 and a grip section 27 containing a detecting circuit 26. The detecting circuit 26 includes a transmitting unit 21, a receiving unit 22, a detection and display unit 23, a transmission/receiving changeover switch 28 and a controller 29 for controlling them. The antenna 24 is connected to the switch 28 through a transmission wire 30 passing through the pole 25.

The detecting apparatus may be also arranged such that the resonance circuit of the detecting element has a different resonance frequency set to each type the body. That is, an A type detecting element has a resonance frequency a, a B type detecting element has a resonance frequency b, and a C type detecting element has a resonance frequency c, and a radio wave having any of frequencies a to c is selectively transmitted under the control of the controller 29 of the detecting apparatus in accordance with an object for detecting a body from the transmitting unit 21 so that a desired detecting element can be detected.

[2] Next, embodiments of the body detecting element of the present invention composed of an RFID element and the detecting apparatus using the detecting element will be described.

(a) Use of Body Detecting Element

Mainly exemplified as the body to be identified by the detecting element of the present invention are various type of metal pipes, which are installed under, in and on the ground, such as a gas pipe, tap water pipe, sewerage pipe, cable pipe, optical fiber pipe, oil transportation pipe, chemical transportation pipe, and the like. The detecting element of the present invention can be also applied to identify metal products which are installed for a special object and must be inspected, repaired or replaced later, in addition to the above metal pipes. Exemplified as the material of the metal pipes is a ferromagnetic or conductive material represented by an iron pipe, cast iron pipe, copper or copper alloy pipe, corrosion resistant or heat resistant alloy pipe and the like.

(b) Arrangement of Body Detecting Element

Figure 18:
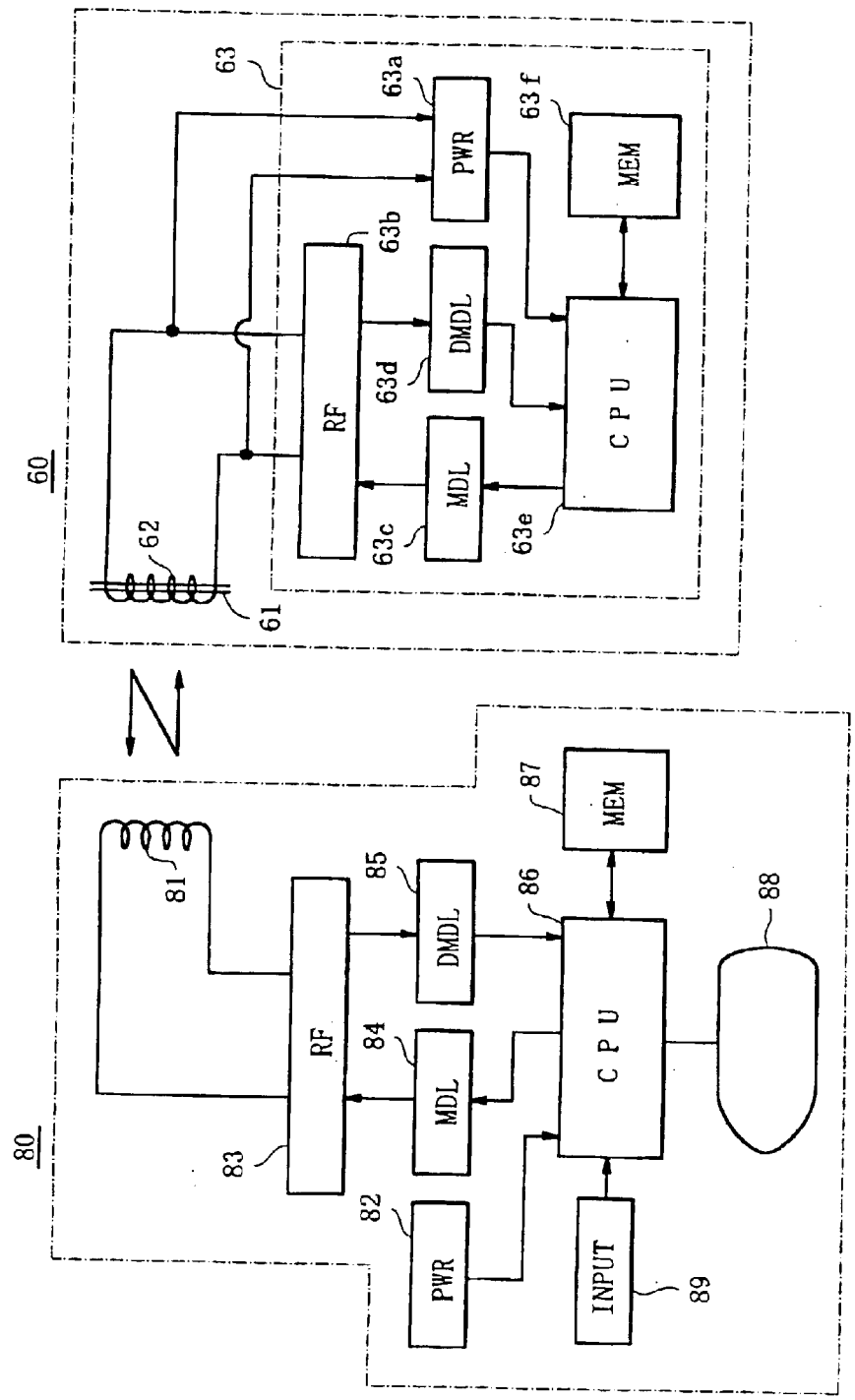
FIG. 18 shows circuit arrangement views of the body detecting element and detecting apparatus of the present invention.

As shown in FIG. 18, a body detecting element 60 includes a magnetic member 61 acting as a magnetic core, an antenna coil 62 wound around the magnetic member 61 and a RFID circuit 63 connected to the antenna coil 62. The RFID circuit 63 includes a power supply circuit 63a, a radio frequency (RF) circuit 63b, a modulation circuit 63c, a demodulation circuit 63d, a CPU 63e and a memory 63f connected to the CPU 63e for storing data characteristic to a body. The power supply circuit 63a contains a capacitor (not shown) which forms a resonance circuit together with the antenna coil 62. When the antenna coil 62 receives a radio wave having a specific resonance frequency, the power generated by the electromagnetic induction of the antenna coil 62 is charged to the capacitor. The power supply circuit 63a rectifies and stabilizes the power and supplies it to the CPU 63e, thereby activating the RFID circuit 63.

The memory 63f of the detecting element 60 includes a ROM (read only memory), a RAM (random-access memory) and an EEPROM (electrically erasable programmable read only memory). Data stored in the memory 63f is read out therefrom in response to a read command supplied through the data communication effected by a radio wave from a detecting apparatus 80 under the control of the CPU 63e as well as data is written in the memory 63f in response to a write command from the detecting apparatus 80.

For example, when the body is the metal pipe, the following data is stored in the memory 63f of the detecting element 80.

(i) When the detecting element is mounted on the metal pipe just after the metal pipe is manufactured, data such as the manufacturing conditions, size, material and inspection result of the metal pipe are stored so that they are helpful to properly deliver the metal pipe to a field where it is installed.

(ii) When the detecting element is mounted on the metal pipe before the metal pipe is installed, data such as the name of a plant in which the metal pipe is installed, the place where the metal pipe is installed, the procedure by which the metal pipe is installed, the name of a fluid flowing in the petal pipe, the flowing system of the fluid and the like are stored so that erroneous connection of the metal pipe can be prevented as well as the metal pipe can be easily detected when it is inspected after installation.

(iii) After the metal pipe is installed, data such as the temperature of the metal pipe while it is used, the presence of abnormality, and the like are written so that the data can be helpfully used in the next inspection and maintenance.

Figure 11:
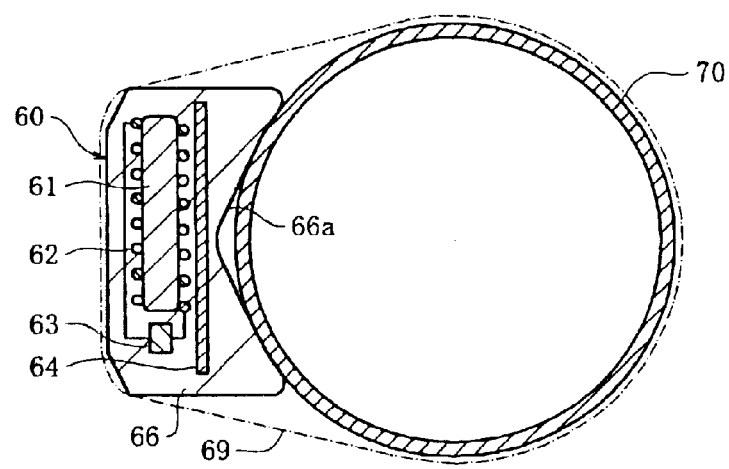
FIG. 11 is a sectional view showing how a detecting element using an electromagnetic shield member is mounted on a body.
Figure 13:
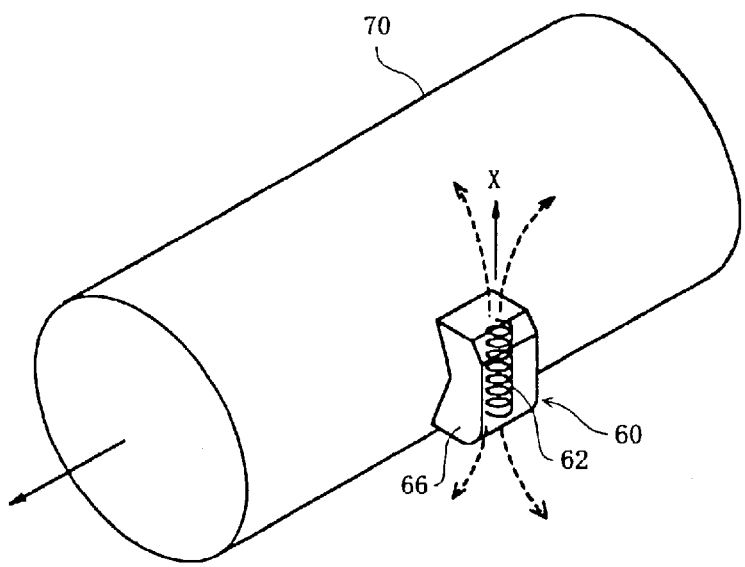
FIG. 13 is a perspective view showing how the detecting element is mounted on the body in correspondence to FIG. 11.
Figure 14:
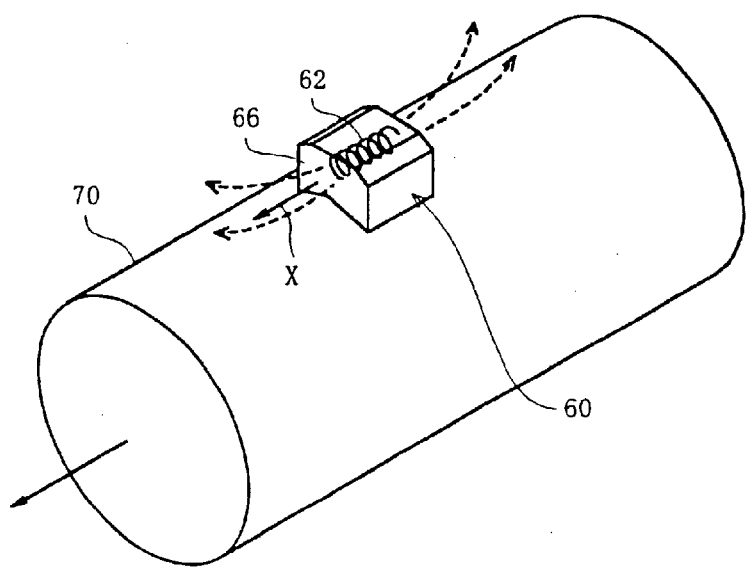
FIG. 14 is a perspective view showing how the detecting element is mounted on the body in correspondence to FIG. 12.
Figure 15:
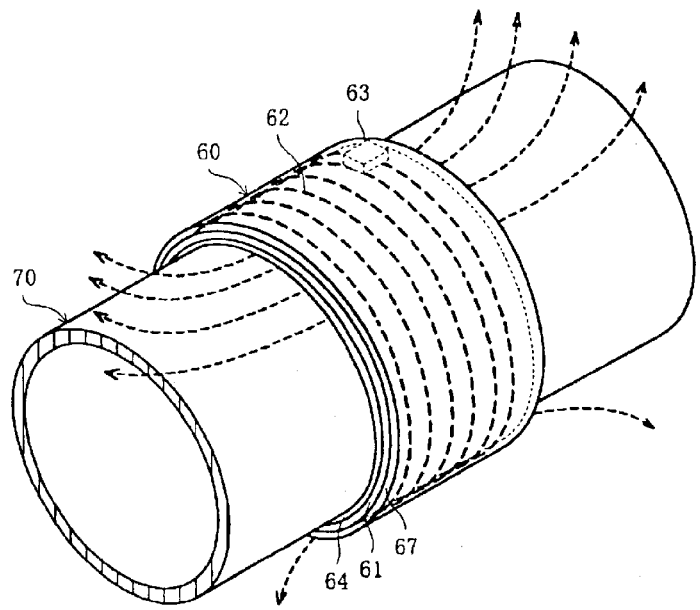
FIG. 15 is a perspective view showing how a detecting element using an electromagnetic shield member is mounted on a body.
Figure 16:
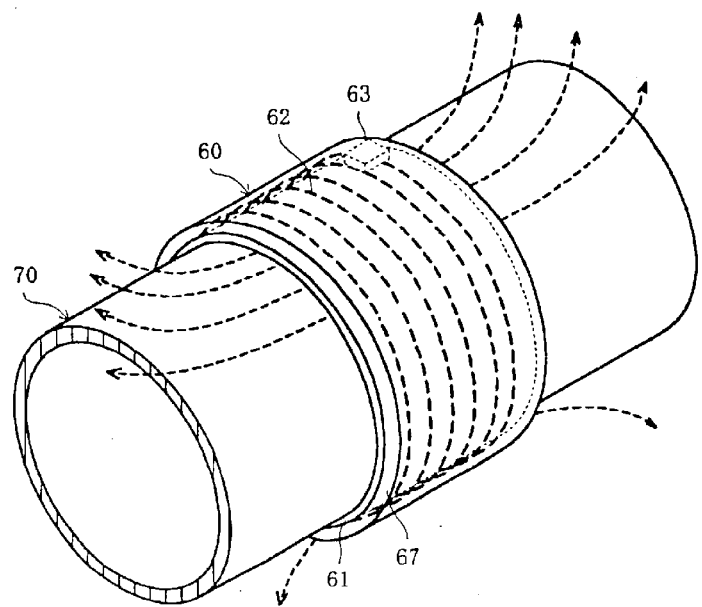
FIG. 16 is a perspective view showing how a detecting element using no electromagnetic shield member is mounted on a body.
Figure 17:
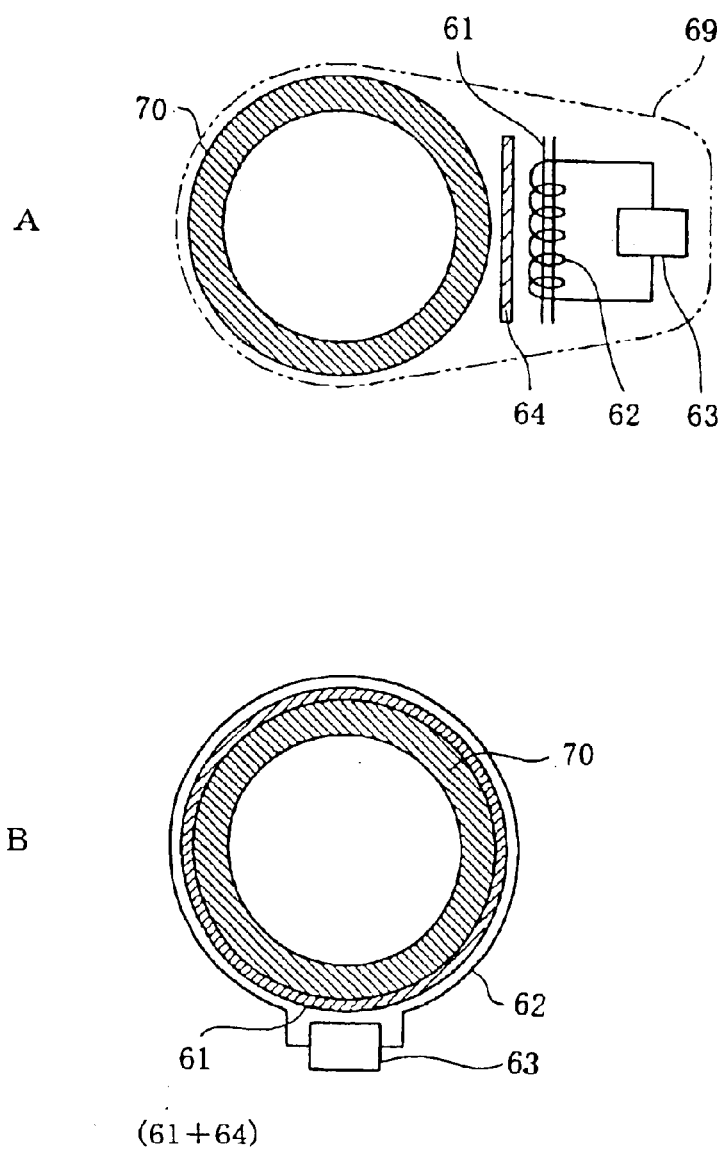
FIG. 17 is a view showing an equivalent circuit of a body detecting element of the present invention.

A solid sheet shape, solid columnar shape and solid square pillar shape are employed in a sixth aspect of the invention and in the modifications thereof and a hollow cylindrical shape is employed in seventh, eighth and ninth aspects of the invention, as the shape of the magnetic member 61 acting as the magnetic core of the antenna coil 62. The cylindrical shape may be formed by collecting a plurality of arc-shaped sheet pieces or may be formed of a thin film or a foil. As shown in FIG. 11 to FIG. 16, it is preferable that the magnetic member 61, the antenna coil 62, the RFID circuit 63 and the like of the present invention are wrapped with an insulating member 66 (FIG. 1) excellent in air tightness, water tightness and weather resistance. This is because that they are exposed to direct sunlight and wind and rain, placed in a high temperature and highly humid environment and buried in the ground. The magnetic member 61, the antenna coil 62 wound around the magnetic member 61, the electromagnetic shield member 64 which is shown in FIGS. 11, 15 and 17, and further the insulating member 66 are similar to those used in the above body detecting element composed of the antenna coil and capacitor. Thus, the description thereof is not repeated.

(c) Method of Mounting Body Detecting Element on a Body

Figure 12:
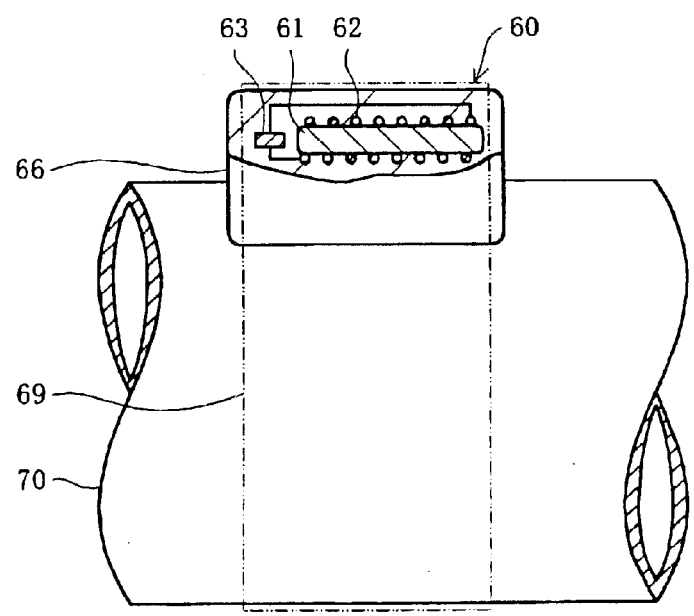
FIG. 12 is a sectional view showing how a detecting element using no electromagnetic shield member is mounted on a body by another method.

In the sixth aspect of the invention, the detecting element 60 is mounted on a body 70 integrally therewith such that the outer peripheral surface of the antenna coil 62 confronts the outer surface of the body 70 as shown in FIG. 11 or FIG. 12. The detecting element may be directly bonded to the outer surface of the body by an adhesive or mounted thereon through a screw means such as screws or the like. The procedural steps for mounting the detecting element when the body is the metal pipe, the procedural steps when the axial center direction X of the antenna coil 62 is directed vertically as shown in FIG. 13 and the procedural steps when the axial center direction X of the antenna coil 62 is directed horizontally as shown in FIG. 14 are similar to those of the above body detecting element composed of the antenna coil and the capacitor. Thus, the description of the procedural steps are not repeated here. Note that FIG. 17A shows an equivalent circuit at the time, and the arrows of dotted lines in FIG. 13 and FIG. 14 show lines of magnetic force in resonance.

As shown in FIG. 11, when the electromagnetic shield member 64 is used in a modification of the sixth aspect of the invention, the detecting element must be mounted such that the electromagnetic shield member directly confronts the body. In contrast, when the electromagnetic shield member is mounted oppositely, the resonance circuit, which is composed of the antenna coil and the capacitor of the power supply circuit is sandwiched between the electromagnetic shield member and the body and does not receive a radio wave at all so that the detecting element is not activated.

In the eighth aspect of the invention, after the outer peripheral surface of the body 70 composed of the magnetic member is covered with the electromagnetic shield member 64 as shown in FIG. 15, the body 70 is covered with the magnetic member 61 through the electromagnetic shield member 64. When no electromagnetic shield member is used as shown in FIG. 16, the outer peripheral surface of the body 70 composed of a non-magnetic material such as copper or copper alloy is covered with the magnetic member 61. Next, the antenna coil 62 is formed by winding a conductive wire around the magnetic member 61 and the RFID circuit 63 is connected to both the ends of the coil. FIG. 17B shows an equivalent circuit thereof.

(d) Arrangement of Detecting Apparatus and Method of Detecting a Body Thereby

As shown in FIG. 18, a detecting apparatus 80 is a handy type RFID controller and includes a transmit/receive antenna 81, a power supply circuit 82 containing a battery, a radio frequency (RF) circuit 83, a modulation circuit 84 and a demodulation circuit 85. Further, the detecting apparatus 80 includes a CPU 86, and a memory 87, a display 88 and an input unit 89 connected to the CPU 86.

An example of a method of identifying a body on which the body detecting element 60 is mounted by the detecting apparatus 80 arranged as described above will be described. In the example, the body is a steel pipe installed in a plant factory and the body detecting element 60 is mounted thereon as shown in FIG. 11. Returning to FIG. 18, the memory 63f of the body detecting element 60 previously stores data characteristic to the steel pipe (identification code, pipe size, pipe material, name of a fluid flowing in the pipe, and the like). An identification code query signal is transmitted from the transmit/receive antenna 81 of the detecting apparatus 80 to the antenna coil 62 of the detecting element 60 through a radio wave having a specific frequency. The query signal is a binary digital signal. The digital signal is issued from the signal generator (not shown) of the detecting apparatus 80 and modulated by the modulation circuit 84. The RF circuit 83 amplifies the modulated signal and transmits it from the antenna 81. ASK (amplification modulation), FSK (frequency modulation) or PSK (phase modulation), for example, is exemplified as the modification.

The radio wave of the transmitted query signal is received by the antenna coil 62 without the change of the frequency thereof due to the electromagnetic shield member 64 (FIG. 11) interposed between the outer peripheral surface of the antenna coil 62 of the detecting element 60 and the steel pipe 70, whereby the power generated by the electromagnetic induction of the coil is charged to the capacitor of the power supply circuit 63a. The power supply circuit 63a rectifies and stabilizes the power and supplies it to the CPU 63e, thereby activating the RFID circuit 63. Next, the RF circuit 63b of the RFID circuit 63 captures only a signal necessary to demodulation, the demodulation circuit 63d reproduces the query signal of the original digital signal, and the data such as the identification code characteristic to the steel pipe, the pipe size, the pipe material, the name of the fluid flowing in the pipe, and the like are transmitted from the memory 63f to the detecting apparatus 80. The data is transmitted by modulating the binary identification code by the modulation circuit 63c of the RFID circuit 63, amplifying it by the RF circuit 63b and transmitting it from the antenna coil 62.

Next, the detecting apparatus 80 having received the data can confirm the information characteristic to the steel pipe on the display 88. When the steel pipe is inspected and the result of inspection is written in the memory 63f of the detecting element 60, the data of the result of inspection is input by the input unit 89 and transmitted from the detecting apparatus 80 to the detecting element 60 similarly to the transmission of the identification code. The data of the result of inspection is written in the memory 63f of the body detecting element 60 and used as reference data in the next inspection.

Next, embodiments of the body detecting element and the detecting apparatus using it of the present invention will be described together with comparative examples.

<First Embodiment>

90 sheets of soft magnetic amorphous foils (made by Allied Chemical Co, commodity name; METAGLAS 2714A) each having a thickness of 25 $\mu$m, a length of 150 mm and a width of 25 mm were prepared, and a magnetic body, which was composed of a laminated body having a thickness of about 5 mm, a length of 150 mm and a width of 25 mm, was made by alternately laminating the foils and insulting papers. The magnetic body was used as a magnetic core and an antenna coil was formed by winding a copper wire having a thickness of 0.3 mm and coated with an insulating film around the magnetic body 260 times. Thereafter, a chip capacitor of 210 pF was connected to both the ends of the coil. A detecting element using no electromagnetic shield member was made by putting the magnetic body, the antenna coil and the capacitor were into a polypropylene case having a thickness of 5 mm. The detecting element was mounted on a side of a steel pipe having an outside diameter of 101.3 mm and an inside diameter of 93.2 mm integrally therewith through a polypropylene spacer having a thickness of 55 mm as shown in FIG. 3.

<Second Embodiment>

A magnetic body similar to the first embodiment was made. The magnetic body was used as a magnetic core and an antenna coil was formed by winding a conductive having a thickness of 0.3 mm and coated with an insulating film around the magnetic body 290 times. Thereafter, a chip capacitor similar to that of the first embodiment was connected to both the ends of the coil. A copper sheet having a thickness of 0.3 mm, a length of 200 mm and a width of 50 mm was prepared as an electromagnetic shield member. A detecting element was made by putting the magnetic body, the antenna coil, the capacitor and the electromagnetic shield member into a polypropylene case having a thickness of 5 mm. The detecting element was mounted on a side of a steel pipe similar to that of the first embodiment integrally therewith through a polypropylene spacer having a thickness of 35 mm such that the electromagnetic shield member confronts the steel pipe as shown in FIG. 3.

<Third Embodiment>

A detecting element similar to that of the second embodiment except that a polypropylene spacer having a thickness of 15 mm was used was mounted on a side of a steel pipe similar to that of the second embodiment integrally therewith in the same manner as the second embodiment.

<Fourth Embodiment>

A detecting element similar to that of the second embodiment except that a polypropylene spacer having a thickness of 5 mm was used was mounted on a side of a steel pipe similar to that of the first embodiment integrally therewith in the same manner as the second embodiment.

<Fifth Embodiment>

A detecting element similar to that of the second embodiment was directly mounted on a side of a steel pipe similar to that of the first embodiment in intimate contact therewith without using a polypropylene spacer as shown in FIG. 3.

COMPARATIVE EXAMPLE 1

A detecting element similar to that of the first embodiment using no electromagnetic shield member was mounted on a side of a steel pipe similar to that of the first embodiment integrally therewith without using a polypropylene spacer.

COMPARATIVE EXAMPLE 2

A detecting element, which was similar to that of the first embodiment using no electromagnetic shield member except that a polypropylene spacer having a thickness of 5 mm was used, was mounted on a side of a steel pipe similar to that of the first embodiment integrally therewith in the same manner as the first embodiment.

COMPARATIVE EXAMPLE 3

A detecting element, which was similar to that of the first embodiment using no electromagnetic shield member except that a polypropylene spacer having a thickness of 15 mm was used, was mounted on a side of a steel pipe similar to that of the first embodiment integrally therewith in the same manner as the first embodiment.

COMPARATIVE EXAMPLE 4

A detecting element, which was similar to that of the first embodiment using no electromagnetic shield member except that a polypropylene spacer having a thickness of 35 mm was used, was mounted on a side of a steel pipe similar to that of the first embodiment integrally therewith in the same manner as the first embodiment.

<Comparison and Evaluation>

The steel pipes, on which the respective detecting elements of the first to fifth embodiments and the comparative examples 1–4 were mounted integrally therewith, were horizontally buried in the ground at positions which were 50 cm deep from the ground level. A radio wave having a specific frequency was transmitted from the detecting apparatus located on the ground just above the respective buried detecting elements thereto, and it was examined whether a resonant reflected radio wave reached the detecting apparatus or not. The result of examination is shown in Table 1.

TABLE 1

|  | Number of turns of windings of coil (turns) | Presence of electro-magnetic shield member | Distance from the outer periphery of coil to steel pipe (mm) | Presence of reflecting radio wave |
|---|---|---|---|---|
| Embodiment 1 | 260 | No | 60 | Yes |
| Embodiment 2 | 290 | Yes | 40 | Yes |
| Embodiment 3 | 290 | Yes | 20 | Yes |
| Embodiment 4 | 290 | Yes | 10 | Yes |
| Embodiment 5 | 290 | Yes | 5 | Yes |
| Comparative Example 1 | 260 | No | 5 | No |
| Comparative Example 2 | 260 | No | 10 | No |
| Comparative Example 3 | 260 | No | 20 | No |
| Comparative Example 4 | 260 | No | 40 | No |

In Table 1, the distance from the outer peripheral surface of the coil to the steel pipe is a value obtained by adding the thickness (5 mm) of the polypropylene case and the thickness of the polypropylene spacer.

As apparent from Table 1, the comparative examples 1–4 demonstrate the fact that a detecting apparatus conventionally can not detect a resonant reflected radio wave unless a detecting element is buried spaced apart from a steel pipe by the distance of at least the diameter (100 m) of the steel pipe when the detecting element is not provided with an electromagnetic shield member. In contrast, in the detecting element of the first embodiment which was not provided with an electromagnetic shield member, the detecting apparatus could capture the resonant reflected radio wave even if the detecting element was varied at a position very near to the steel pipe, that is, at a position only 60 cm apart therefrom. Further, in the detecting elements of the second to fifth embodiments which were provided with the electromagnetic shield member, the detecting apparatus could capture the resonant reflected radio wave even if they were varied at positions much near to the steel pipes, that is, at positions not more than 40 cm therefrom.

<Sixth Embodiment>

A copper sheet having a thickness of 0.1 mm was wound around a steel pipe having an outside diameter of 25 mm and an inside diameter of 23 mm as an electromagnetic shield member. A soft magnetic amorphous foil (made by Allied Chemical Co, commodity name; METAGLAS 2605S-2), which had a thickness of 25 $\mu$m, a length of 1200 mm and a width of 50 mm and a surface on which an insulating film was formed with an acrylic paint coated thereto, was prepared as a magnetic member. The soft magnetic amorphous foil on which the insulating film was formed was further wound around the copper sheet and a copper wire having a thickness of 0.2 mm and coated with an insulating film was wound around the periphery of the magnetic member 420 times, whereby an antenna coil was formed. Thereafter, a detecting element was made by connecting a capacitor of 210 pF to both the ends of the coil. When a radio wave having a specific frequency was transmitted from a detecting apparatus at a place 500 mm apart from the detecting element and it was examined whether a resonant reflected radio wave reached the detecting apparatus or not, the detecting apparatus could detect the resonant reflected radio wave.

Next, embodiments in which a composite member was used as the magnetic member acting as the magnetic core will be described together with comparative examples.

<Seventh Embodiment>

Figure 9:
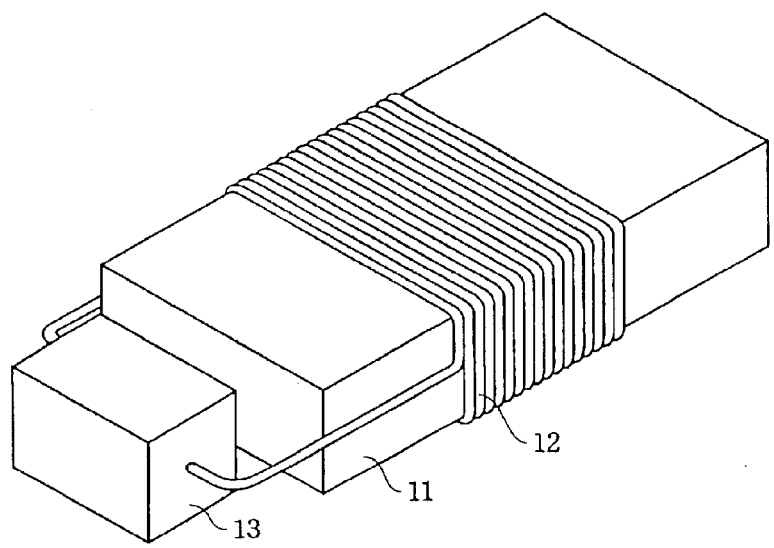
FIG. 9 is a perspective view of a detecting element composed of a magnetic member having an antenna coil concentratedly wound therearound at substantially the center thereof and a capacitor or a piezo-resonator connected to both the ends of the antenna coil.

A magnetic material composed of a composite material containing 74 wt % of Fe powder and 26 wt % of plastic was formed as a magnetic core having a thickness of 10 mm, a length of 100 mm and a width of 10 mm. As shown in FIG. 9, an antenna coil was formed by concentratedly winding a copper wire having a thickness of 0.3 mm and coated with an insulating film around the magnetic core at substantially the center thereof 86 times such that the wound copper wire was in contact with or located near to each other.

<Eighth Embodiment>

A magnetic material composed of a composite material containing 78 wt % of Fe powder and 22 wt % of plastic was formed as a magnetic core having a thickness of 10 mm, a length of 100 mm and a width of 10 mm. As shown in FIG. 9, an antenna coil was formed by concentratedly winding a copper wire having a thickness of 0.3 mm and coated with an insulating film around the magnetic core at substantially the center thereof 78 times such that the wound copper wire was in contact with or located near to each other.

<Ninth Embodiment>

A magnetic material composed of a composite material containing 82 wt % of Fe powder and 18 wt % of plastic was formed as a magnetic core having a thickness of 10 mm, a length of 100 mm and a width of 10 mm. As shown in FIG. 9, an antenna coil was formed by concentratedly winding a copper wire having a thickness of 0.3 mm and coated with an insulating film around the magnetic core at substantially the center thereof 78 times such that the wound copper wire was in contact with or located near to each other.

<Tenth Embodiment>

A magnetic material composed of a composite material containing 86 wt % of Fe powder and 14 wt % of plastic was formed as a magnetic core having a thickness of 10 mm, a length of 100 mm and a width of 10 mm. As shown in FIG. 9, an antenna coil was formed by concentratedly winding a copper wire having a thickness of 0.3 mm and coated with an insulating film around the magnetic core at substantially the center thereof 66 times such that the wound copper wire was in contact with or located near to each other.

<Eleventh Embodiment>

A magnetic material composed of a composite material containing 82 wt % of Fe powder and 18 wt % of plastic was formed as a magnetic core having a thickness of 9 mm, a length of 100 mm and a width of 11 mm. As shown in FIG. 9, an antenna coil was formed by concentratedly winding a copper wire having a thickness of 0.4 mm and coated with an insulating film around the magnetic core at substantially the center thereof 60 times such that the wound copper wire was in contact with or located near to each other.

<Twelfth Embodiment>

A magnetic material composed of a composite material containing 82 wt % of Fe powder and 18 wt % of plastic was formed as a magnetic core having a thickness of 5 mm, a length of 100 mm and a width of 15 mm. As shown in FIG. 9, an antenna coil was formed by concentratedly winding a copper wire having a thickness of 0.4 mm and coated with an insulating film around the magnetic core at substantially the center thereof 56 times such that the wound copper wire was in contact with or located near to each other.

<Thirteenth Embodiment>

A magnetic material composed of a composite material containing 82 wt % of Fe powder and 18 wt % of plastic was formed as a magnetic core having a thickness of 2.5 mm, a length of 100 mm and a width of 20 mm. As shown in FIG. 9, an antenna coil was formed by concentratedly winding a copper wire having a thickness of 0.4 mm and coated with an insulating film around the magnetic core at substantially the center thereof 52 times such that the wound copper wire was in contact with or located near to each other.

<Fourteenth Embodiment>

A magnetic material composed of a composite material containing 82 wt % of Fe powder and 18 wt % of plastic was formed as a magnetic core having a thickness of 4 mm, a length of 100 mm and a width of 25 mm. As shown in FIG. 9, an antenna coil was formed by concentratedly winding a copper wire having a thickness of 0.4 mm and coated with an insulating film around the magnetic core at substantially the center thereof 46 times such that the wound copper wire was in contact with or located near to each other.

<Fifteenth Embodiment>

A magnetic material composed of a composite material containing 82 wt % of Fe powder and 18 wt % of plastic was formed as a magnetic core having a thickness of 3.3 mm, a length of 100 mm and a width of 30 mm. As shown in FIG. 9, an antenna coil was formed by concentratedly winding a copper wire having a thickness of 0.4 mm and coated with an insulating film around the magnetic core at substantially the center thereof 44 times such that the wound copper wire was in contact with or located near to each other.

<Sixteenth Embodiment>

A magnetic material composed of a composite material containing 82 wt % of Fe powder and 18 wt % of plastic was formed as a magnetic core having a thickness of 2.5 mm, a length of 100 mm and a width of 40 mm. As shown in FIG. 9, an antenna coil was formed by concentratedly winding a copper wire having a thickness of 0.4 mm and coated with an insulating film around the magnetic core at substantially the center thereof 40 times such that the wound copper wire was in contact with or located near to each other.

<Seventeenth Embodiment>

Figure 10:
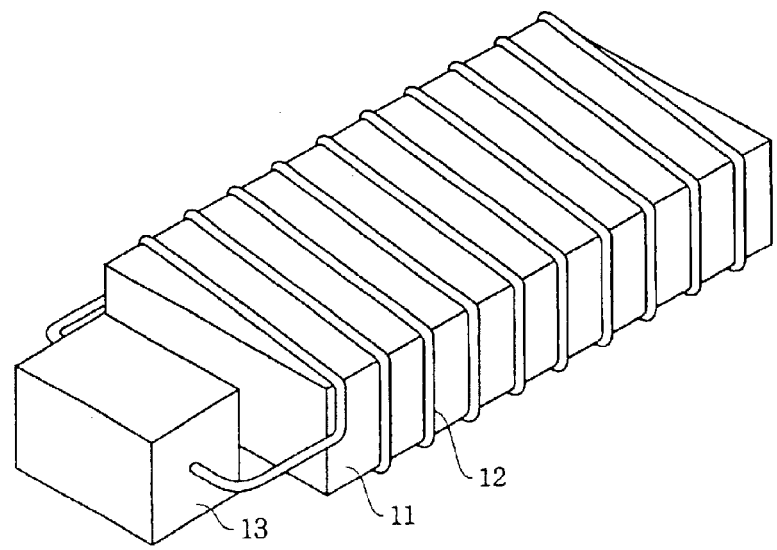
FIG. 10 is a perspective view of a detecting element composed of a magnetic member having an antenna coil wound therearound over the entire length thereof at equal intervals and a capacitor or a piezo-resonator connected to both the ends of the antenna coil.

A magnetic material composed of a composite material containing 82 wt % of Fe powder and 18 wt % of plastic was formed as a magnetic core having a thickness of 2.5 mm, a length of 100 mm and a width of 20 mm. As shown in FIG. 10, an antenna coil was formed by winding a copper wire having a thickness of 0.4 mm and coated with an insulating film around the magnetic core over the entire length thereof 60 times such that the wound copper wire had uniform intervals.

COMPARATIVE EXAMPLE 5

An antenna coil was formed by concentratedly winding a copper wire having a thickness of 0.3 mm and coated with an insulating film around a magnetic core having the same shape and the same size as those of the seventh to tenth embodiments at substantially the center thereof 60 times such that the wound copper wire was in contact with or located near to each other.

COMPARATIVE EXAMPLE 6

A magnetic material composed of a composite material containing 70 wt % of Fe powder and 30 wt % of plastic was formed as a magnetic core having the same shape and the same size as those of the seventh embodiment. As shown in FIG. 9, an antenna coil was formed by concentratedly winding a copper wire having a thickness of 0.3 mm and coated with an insulating film around the magnetic core at substantially the center thereof 102 times such that the wound copper wire was in contact with or located near to each other.

COMPARATIVE EXAMPLE 7

A magnetic material composed of a composite material containing 90 wt % of Fe powder and 10 wt % of plastic was formed as a magnetic core having the same shape and the same size as the seventh embodiment. As shown in FIG. 9, an antenna coil was formed by concentratedly winding a copper wire having a thickness of 0.3 mm and coated with an insulating film around the magnetic core at substantially the center thereof 62 times such that the wound copper wire was in contact with or located near to each other.

<Comparison and Evaluation>

The Q values of the antenna coils of the seventh to seventeenth embodiments and the comparative examples 6–7 were measured. Thereafter, detecting elements were made by connecting a piezo-resonator to both the ends of each antenna coil. Each of the thus made detecting elements was horizontally disposed on a base and approached to the detecting apparatus while transmitting a radio wave having a specific frequency from the axial center direction of the coil and the distance at which a resonant reflected radio wave reached the detecting apparatus for the first time and the detecting apparatus is operated thereby. Thereafter, the respective detecting elements were pressed around a disc having a radius of 100 mm and it was examined whether the magnetic cores thereof were broken or not. The result of the above examinations are shown in Table 2.

TABLE 2

| | Magnetic core | | | | | Windings | | | | Operating | Presence |
|---|---|---|---|---|---|---|---|---|---|---|---|
| | Fe (%) | Length (mm) | Width (mm) | Thickness (mm) | Ratio (%) | Dia. of wire (mm) | Number of turns (turns) | Winding method | Q | distance (cm) | of breakage |
| Embodiment 7 | 74 | 100 | 10 | 10 | 1 | 0.3 | 86 | Concentrated | 68 | 65 | No |
| Embodiment 8 | 78 | 100 | 10 | 10 | 1 | 0.3 | 78 | Concentrated | 75 | 78 | No |
| Embodiment 9 | 82 | 100 | 10 | 10 | 1 | 0.3 | 72 | Concentrated | 81 | 95 | No |
| Embodiment 10 | 86 | 100 | 10 | 10 | 1 | 0.3 | 66 | Concentrated | 88 | 96 | No |
| Embodiment 11 | 82 | 100 | 11 | 9 | 1.2 | 0.4 | 60 | Concentrated | 93 | 102 | No |
| Embodiment 12 | 82 | 100 | 15 | 5 | 3 | 0.4 | 56 | Concentrated | 95 | 105 | No |
| Embodiment 13 | 82 | 100 | 20 | 2.5 | 8 | 0.4 | 52 | Concentrated | 93 | 111 | No |
| Embodiment 14 | 82 | 100 | 25 | 4 | 6.3 | 0.4 | 46 | Concentrated | 83 | 105 | No |
| Embodiment 15 | 82 | 100 | 30 | 3.3 | 9 | 0.4 | 44 | Concentrated | 67 | 102 | No |
| Embodiment 16 | 82 | 100 | 40 | 2.5 | 16 | 0.4 | 40 | Concentrated | 55 | 65 | No |
| Embodiment 17 | 82 | 100 | 20 | 2.5 | 8 | 0.4 | 60 | uniform | 85 | 120 | No |
| Comparative Example 5 | Ferrite | 100 | 10 | 10 | 1 | 0.3 | 60 | Concentrated | 97 | 100 | Yes |
| Comparative Example 6 | 70 | 100 | 10 | 10 | 1 | 0.3 | 102 | Concentrated | 57 | 38 | No |
| Comparative Example 7 | 90 | 100 | 10 | 10 | 1 | 0.3 | 62 | Concentrated | 94 | 99 | Yes |

As apparent from Table 2, the antenna coils of the seventh to tenth embodiments were not broken even if the radii of curvature thereof were 10 mm, whereas the antenna coil of the comparative example 5 composed of the ferrite having the same shape and size as those of the above embodiments was broken. Thus, it can be found that the strength of the magnetic member acting as the magnetic core could be improved when it was formed of a composite material.

Further, the magnetic cores of the seventh to tenth embodiments and the comparative examples 6 and 7 had the same shape and size and contained different weight percentage of Fe. It can be found that the characteristics of the magnetic cores could be increased by an increase of the ratio of Fe occupied in the composite materials from the differences of the Q values and the operating distances of the seventh to tenth embodiments and the comparative examples 6 and 7. However, it can be found from the results of examination of the comparative example 6 and the seventh embodiment that the operating distance of the comparative example 6 whose Fe content is less than 74 wt % was greatly lowered than that of the seventh embodiment whose Fe content is 74 wt %. In contrast, the antenna coil of the comparative example 7 whose Fe content exceeded 86 wt % was broken in the radius of curvature of 10 mm, from which it can be found that brittleness was increased.

Further, the antenna coils of the tenth to sixteenth embodiments had different ratios of the long sides to the short sides of the cross sections of the magnetic cores thereof. When the ratios were not less than 1.2, the operating distances of the embodiments exceeded 100 cm, were maximized at a ratio of 8 and thereafter lowered abruptly at a ratio of 16. Thus, it can be found that it is preferable to make the cross-section of the magnetic core flat to some extent.

Furthermore, the copper wire of the thirteenth embodiment was wound differently from that of the seventeenth embodiment. The operating distance of the thirteenth embodiment in which the copper wire was wound concentratedly was 111 cm, whereas the operating distance of the seventeenth embodiment in which the copper wire was wound uniformly was 120 cm. Thus, it can be found that it is preferable to wind the copper wire uniformly than concentratedly.

Next, embodiments in which the detecting element has the RFID circuit will be described together with comparative examples.

<Eighteenth Embodiment>

90 sheets of soft magnetic amorphous foils (made by Allied Chemical Co, commodity name; METAGLAS 2714A) each having a thickness of 25 μm, a length of 150 mm and a width of 25 mm were prepared. A magnetic body 61 shown in FIG. 18, which was composed of a laminated body having a thickness of about 5 mm, a length of 150 mm and a width of 25 mm, was made by alternately laminating the foils and insulting papers. The magnetic body 61 was used as a magnetic core and an antenna coil 62 was formed by winding a copper wire having a thickness of 0.3 mm and coated with an insulating film around the magnetic body 260 times. Thereafter, an RFID circuit 63 composed of an IC arranged as shown in FIG. 18 was connected to both the ends of the coil 62. The magnetic body 61, the antenna coil 62 and the RFID circuit 63 were put into a polypropylene case (not shown) having a thickness of 5 mm and a metal pipe detecting element using no electromagnetic shield member was made. The detecting element was mounted on a side of a steel pipe having an outside diameter of 101.3 mm and an inside diameter of 93.2 mm integrally therewith through a polypropylene spacer having a thickness of 55 mm as shown in FIG. 13.

<Nineteenth Embodiment>

A magnetic body similar to that of the eighteenth embodiment was made. The magnetic body was used as a magnetic core and an antenna coil was formed by winding a conductive having a thickness of 0.3 mm and coated with an insulating film around the magnetic body 290 times. Thereafter, an RFID circuit similar to that of the eighteenth embodiment was connected to both the ends of the coil. A copper sheet having a thickness of 0.3 mm, a length of 200 mm and a width of 50 mm was prepared as an electromagnetic shield member. A metal pipe detecting element was made by putting the magnetic body, the antenna coil, the RFID circuit and the electromagnetic shield member into a polypropylene case having a thickness of 5 mm. The detecting element was mounted on a side of a steel pipe similar to that of the eighteenth embodiment integrally therewith such that the electromagnetic shield member confronts the steel pipe through a polypropylene spacer having a thickness of 35 mm as shown in FIG. 13.

<Twentieth Embodiment>

A detecting element, which was similar to that of the nineteenth embodiment except that a polypropylene spacer having a thickness of 15 mm was used, was mounted on a side of a steel pipe similar to that of the eighteenth embodiment integrally therewith in the same manner as the nineteenth embodiment.

<Twenty-First Embodiment>

A detecting element, which was similar to that of the nineteenth embodiment except that a polypropylene spacer having a thickness of 5 mm was used, was mounted on a side of a steel pipe similar to that of the eighteenth embodiment integrally therewith in the same manner as the nineteenth embodiment.

<Twenty-Second Embodiment>

A detecting element similar to that of the nineteenth embodiment was directly mounted on a side of a steel pipe similar to that of the eighteenth embodiment in intimate contact therewith without using a polypropylene spacer as shown in FIG. 13.

COMPARATIVE EXAMPLE 8

A detecting element similar to that of the eighteenth embodiment using no electromagnetic shield member was mounted on a side of a steel pipe similar to that of the eighteenth embodiment integrally therewith in the same manner as the eighteenth embodiment without using a polypropylene spacer.

COMPARATIVE EXAMPLE 9

A detecting element, which was similar to that of the eighteenth embodiment using no electromagnetic shield member except that a polypropylene spacer having a thickness of 5 mm was used, was mounted on a side of a steel pipe similar to that of the eighteenth embodiment integrally therewith in the same manner as the eighteenth embodiment.

COMPARATIVE EXAMPLE 10

A detecting element, which was similar to that of the eighteenth embodiment using no electromagnetic shield member except that a polypropylene spacer having a thickness of 15 mm was used, was mounted on a side of a steel pipe similar to that of the eighteenth embodiment integrally therewith in the same manner as the eighteenth embodiment.

COMPARATIVE EXAMPLE 11

A detecting element, which was similar to that of the eighteenth embodiment using no electromagnetic shield member except that a polypropylene spacer having a thickness of 35 mm was used, was mounted on a side of a steel pipe similar to that of the eighteenth embodiment integrally therewith in the same manner as the eighteenth embodiment.

<Comparison and Evaluation>

The detecting apparatus 80 shown in FIG. 18 transmitted a query signal through a radio wave having a specific frequency from a place which was spaced apart from steel pipes by 50 cm, on which the respective detecting elements of the eighteenth to twenty-second embodiments and the comparative examples eighth to eleventh were mounted integrally therewith. It was examined whether a response signal was transmitted from the respective detecting elements to the detecting apparatus 80 or not. Table 3 shows the result of examination.

TABLE 3

| | Number of turns of windings of coil (turns) | Presence of electromagnetic shield member | Distance from the outer periphery of coil to steel pipe (mm) | Presence of reflecting radio wave |
|---|---|---|---|---|
| Embodiment 18 | 260 | No | 60 | Yes |
| Embodiment 19 | 290 | Yes | 40 | Yes |
| Embodiment 20 | 290 | Yes | 20 | Yes |
| Embodiment 21 | 290 | Yes | 10 | Yes |
| Embodiment 22 | 290 | Yes | 5 | Yes |
| Comparative Example 8 | 260 | No | 5 | No |
| Comparative Example 9 | 260 | No | 10 | No |
| Comparative Example 10 | 260 | No | 20 | No |
| Comparative Example 11 | 260 | No | 40 | No |

In Table 3, the distance from the outer peripheral surfaces of the coils to the steel pipes is a value obtained by adding the thickness (5 mm) of the polypropylene case and the thickness of the polypropylene spacer.

As apparent from Table 3, it can be found that when no electromagnetic shield member was provided with the detecting element and the detecting element was disposed apart from the steel pipe by 60 cm as in the first embodiment, the detecting element exhibited an identifying function, whereas when the detecting element was approached to the steel pipe by a distance of not more than 40 cm, the detecting element lost its identifying function. Further, the detecting elements of the nineteenth to twenty-second embodiments, which were provided with the electromagnetic shield member, received response signal and maintained the identifying function even if they were mounted at positions very near to the steel pipe, that is, at positions not more than 40 cm therefrom.

<Twenty-Third Embodiment>

A copper sheet having a thickness of 0.1 mm was wound around a steel pipe having an outside diameter of 25 mm and an inside diameter of 23 mm as an electromagnetic shield member. A soft magnetic amorphous foil (made by Allied Chemical Co., commodity name; METAGLAS 2605S-2) having a thickness of 25 $\mu$m, a length of 1200 mm and a width of 50 mm and a surface on which an insulating film is formed with an acrylic paint coated thereto was prepared as a magnetic member. The soft magnetic amorphous foil, on which the insulating film was formed, was further wound around the copper sheet and a copper wire having a thickness of 0.2 mm and coated with an insulating film was wound around the magnetic member 420 times, whereby an antenna coil was formed. Thereafter, a metal pipe detecting element was made by connecting the RFID circuit 63 composed of the IC arranged as shown in FIG. 18 to both the ends of the coil. When a query signal was transmitted through a radio wave having a specific frequency from the detecting apparatus at a place 500 mm apart from the detecting element and it was examined whether a response signal was transmitted from the detecting element to the detecting apparatus or not, the detecting apparatus received the response signal.

As described above, the body detecting element of the present invention is mounted on a body such as a metal pipe and the like with the outer peripheral surface of the antenna coil confronting the outer periphery of the body. Accordingly, even if the detecting element is mounted on the body integrally therewith, a resonant frequency and the Q value of the coil are not varied and the body can be accurately detected. In particular, when the detecting element is mounted on the body such that the antenna coil confronts the outer surface of the body through the electromagnetic shield member, resonance characteristics can be more enhanced. As a result, even if a body other than the above body is dug up, there is almost no possibility that the detecting element is broken by mistake or moved to another position, and when the detecting element is detected at a predetermined timing, it can be accurately detected.

In particular, when the magnetic member 11 acting as the magnetic core is formed of a composite material containing Fe or Fe—Co alloy powder or flake in an amount not less than 74 wt % to not more than 86 wt % and plastic in an amount not less than 14 wt % to not more than 26 wt %, even if the boy is a crushing power, explosive or the like loaded in a hole drilled in a rock, rock bed, concrete or the like and the detecting element is loaded together with the crushing power, explosive or the like, the detecting element has a sufficient strength to a job for loading it and the crushing power, explosive or the like can be accurately detected when it was not exploded.

Further, since the body detecting element of the present invention is mounted on the body such as the metal pipe and the like with the outer peripheral surface of the antenna coil confronting the outer surface of the body, the resonance frequency of the detecting element and the Q value of the coil are not changed even if the detecting element is mounted on the body integrally therewith, whereby the body can be securely detected. In particular, when the detecting element is mounted of the body such that the antenna coil confronts the outer surface of the body through the electromagnetic shield member, the function of the RFID can be improved. As a result, when the detecting elements of the present invention are mounted on metal pipes in a plant factory where many kinds of metal pipes are complicatedly installed and the installation, inspection and the like of the metal pipes are carried out while transmitting a query signal from the detecting apparatus and confirming the transmission thereof by a response signal, the erroneous connection, inspection and the like of the metal pipes can be prevented. Further, when the states of the metal pipes are recorded in the memory of the detecting element when they are inspected, the detecting apparatus can read out the history of the metal pipe from the memory and confirm it later.

INDUSTRIAL APPLICABILITY

The body detecting element and the detecting apparatus using it of the present invention can detect various kinds of metal pipes and metal bodies such as gas pipes, tap water pipes, sewerage pipes, cable pipes, optical fiber pipes, oil transportation pipes, chemicals transportation pipes and the like which are installed on the ground or buried in the ground or bodies such as crushing powders, explosives and the like which are loaded at predetermined places for crushing or exploding rocks, rock beds, concrete and so on.

What is claimed is:

1. A body detecting element configured to be buried in the ground with a metal body and comprising:
   a detector housing configured to be integrally mounted on an outer surface of the metal body;
   a magnetic member disposed in the detector housing and configured as a magnetic core;
   an antenna coil wound around the magnetic member; and
   one of a capacitor and a piezo-resonator connected to both the ends of the antenna coil to form a resonance circuit with the antenna coil, wherein
   the detector housing includes one of a cross section and a length smaller than a corresponding cross section and length of an area to be detected by said body detecting element.

2. A body detecting element according to claim 1, wherein the magnetic member acting comprises:
   a plurality of laminated soft magnetic metal thin films or thin sheets.

3. A body detecting element according to claim 1, wherein the metal body is a metal pipe and the antenna coil is disposed in the detector housing with the axial center direction perpendicular to the axial center direction of the metal pipe.

4. A body detecting element according to claim 1, wherein the metal body is a metal pipe and the antenna coil is disposed in the detector housing with the axial center direction in parallel with the axial center direction of the metal pipe.

5. A body detecting element according to claim 1, wherein the body is a metal pipe and the detector housing is an insulating member including a recessed surface configured to fit around a portion of the metal pipe.

6. A body detecting element according to claim 1, wherein the detector housing includes one of convex portion and a convex surface opposite from a surface in contact with the outer surface of the metal body.

7. A detecting apparatus, comprising
   a transmitting unit configured to transmit a radio wave having a specific frequency from the ground to a body detecting element according to claim 1;
   a receiving unit configured to receive a radio wave generated by the resonation of the resonance circuit of the detecting element; and a detection and display unit configured to detect and display the received radio wave.

8. A body detecting element according to claim 1, further comprising:

an electromagnetic shield member disposed in the detector housing between the magnetic member and the metal body, and comprising copper, copper alloy or aluminum with the outer peripheral surface thereof confronting the outside surface of the body.

9. A body detecting element according to claim 8, wherein the body is a metal pipe, and the detector housing is an insulating member including a recessed surface configured to fit around a portion of the metal pipe.

10. A body detecting element according to claim 1, wherein the magnetic member comprises:

a composite material comprising soft magnetic metal powder or ferrite powder and plastic.

11. A body detecting element according to claim 10, wherein the magnetic member comprises:

a composite material comprising Fe or Fe—Co alloy powder or flake in an amount not less than 74 wt % to not more than 86 wt % and plastic in an amount not less than 14 wt % to not more than 26 wt %.

12. A body detecting element according to claim 10, wherein the magnetic core is a columnar body having a rectangular or elliptic cross-section and the ratio of the long side to the short side of the rectangular shape and the ratio of the major axis to the minor axis of the elliptic shape are not less than 1.2 to less than 16.

13. A body detecting element according to claim 12, wherein the antenna coil is substantially uniformly wound around the columnar body over the entire length thereof.

14. A body detecting element configured to be buried in the ground with a non-magnetic metal pipe, the body detecting element comprising:

a flexible magnetic member configured as a magnetic core and further configured to be wrapped completely around an outer surface of the non-magnetic metal pine along a predetermined length of the non-magnetic metal pipe;

an antenna coil wound around the magnetic members; and one of a capacitor and a piezo-resonator connected to both the ends of the antenna coil to form a resonance circuit with the antenna coil.

15. A body detecting element according to claim 14, wherein the flexible magnetic member comprises:

a plurality of soft magnetic metal thin films or thin sheets.

16. A body detecting element configured to be buried in the ground with a magnetic metal pipe and a flexible electromagnetic shield member configured to be wrapped completely around an outer surface of the magnetic metal pipe along a predetermined length of the magnetic metal pipe, and comprising copper, copper alloy or aluminum;

a flexible magnetic member wrapped around the electromagnetic shield member, and configured as a magnetic core, an antenna coil wound around the magnetic member; and one of a capacitor and piezo-resonator connected to both the ends of the antenna coil to form a resonance circuit with the antenna coil.

17. A body detecting element configured to be buried with an explosive body and comprising:

a detector housing configured to be integrally mounted on an outer surface of the explosive body;

a magnetic member configured as a magnetic core and comprising a composite material comprising Fe or Fe—Co alloy powder or flake in an amount not less than 74 wt % to not more than 86 wt % and plastic in an amount not less than 14 wt % to not more than 26 an antenna coil wound around the magnetic member; and one of a capacitor a piezo-resonator connected to both the ends of the antenna coil to form a resonance circuit with the antenna coil, wherein the detector housing includes one of a cross section and a length smaller than a corresponding cross section and length of an area to be detected by said body detecting element.

18. A body detecting element according to claim 17, wherein the magnetic core is a columnar body having a rectangular or elliptic cross section and the ratio of the long side to the short side of the rectangular shape and the ratio of the major axis to the minor axis of the elliptic shape are not less than 1.2 to less than 16.

19. A body detecting element according to claim 18, wherein the antenna coil is substantially uniformly wound around the columnar body over the entire length thereof.

20. A body detecting element mounted on a metal body and comprising:

a detector housing configured to be integrally mounted on an outer surface of the metal body;

a magnetic member disposed in the detector housing and configured as a magnetic core, an antenna coil wound around the magnetic member; and an RFID circuit connected to the antenna coil, wherein the RFID circuit includes a memory for storing data characteristic to the metal body, is activated by a radio wave having a specific frequency and transmitted from a detecting apparatus, reads data from the memory in response to a read command issued by the data communication through the radio wave, writes data to the memory in response to a write command and issues a response command to the detecting apparatus, wherein the detector housing includes one of a cross section and a length smaller than a corresponding cross section and length of an area to be detected by said body detecting element.

21. A body detecting element according to claim 20, wherein the magnetic member comprises:

a plurality of laminated soft magnetic metal thin films or thin sheets.

22. A body detecting element according to claim 20, wherein the magnetic member comprises:

a composite material comprising soft magnetic metal powder or ferrite powder and plastic.

23. A body detecting element according to claim 20, wherein the body is a metal pipe and the antenna coil is disposed with the axial center direction thereof perpendicular to the axial center direction of the body.

24. A body detecting element according to claim 20, wherein the body is a metal pipe and the antenna coil is disposed with the axial center direction thereof in parallel with the axial center direction of the body.

25. A body detecting element according to claim 20, wherein the body is a metal pipe, and the detector housing includes a recessed surface configured to fit around a portion of the metal pipe.

26. A body detecting element according to claim 20, wherein the detector housing includes one of a convex portion and a convex surface opposite from a surface in contact with the outer surface of the metal body.

27. A body detecting apparatus comprising:

means for transmitting a radio wave having a specific frequency to a body detecting element according to claim 20;

means for activating the RFID circuit of the body detecting element in response to the radio wave; and means for reading and writing data from and in the memory of the RFID circuit; and means for receiving a response signal from the detecting element, thereby identifying the body.

28. A body detecting element according to claim 20, further comprising:

an electromagnetic shield member disposed in the detector housing between the magnetic member and the metal body, and comprising copper alloy or aluminum with the outer peripheral surface thereof confronting the outside surface of the body.

29. A body detecting element according to claim 28, wherein the body is a metal pipe, and the detector housing includes a recessed surface configured to fit around a portion of the metal pipe.

30. A body detecting element configured to be mounted on a non-magnetic metal pipe and comprising:

a flexible magnetic member configured as a magnetic core and further configured to be wrapped completely around an outer surface of the non-magnetic metal pipe along a predetermined length of the non-magnetic metal pipe;

an antenna coil wound around the magnetic member; and an RFID circuit connected to the antenna coil, wherein the RFID circuit includes a memory for storing data characteristic to the body, is activated by a radio wave having a specific frequency and transmitted from a detecting apparatus, reads data from the memory in response to a read command issued by the data communication of the radio wave, writes data to the memory in response to a write command and issues a response command to the detecting apparatus.

31. A detecting element according to claim 30, wherein the flexible magnetic member comprises:

a plurality of soft magnetic metal thin films or thin sheets.

32. A body detecting element configured to be mounted on a magnetic metal pipe and comprising:

a flexible electromagnetic shield member configured to be wrapped completely around an outer surface of the magnetic metal pipe along a predetermined length of the magnetic metal pipe, and comprising copper, copper alloy or aluminum;

a flexible magnetic member wrapped around the electromagnetic shield member and configured as a magnetic core;

an antenna coil wound around the magnetic member; and an RFID circuit connected to the antenna coil, wherein the RFID circuit includes a memory for storing data characteristic to the body, is activated by a radio wave having a specific frequency and transmitted from a detecting apparatus, reads data from the memory in response to a read command issued by the data communication of the radio wave, writes data to the memory in response to a write command and issues a response command to the detecting apparatus.

* * * * *